United States Patent
Halahmi et al.

(10) Patent No.: US 7,501,174 B2
(45) Date of Patent: Mar. 10, 2009

(54) HIGH PERFORMANCE GEOSYNTHETIC ARTICLE

(75) Inventors: Izhar Halahmi, Hod Hasharon (IL); Oded Erez, Tel Aviv (IL); Adi Erez, Tel Aviv (IL)

(73) Assignee: PRS Mediterranean Ltd. (IL)

( * ) Notice: Subject to any disclaimer, the term of this patent is extended or adjusted under 35 U.S.C. 154(b) by 0 days.

(21) Appl. No.: 11/680,987

(22) Filed: Mar. 1, 2007

(65) Prior Publication Data

US 2008/0213572 A1    Sep. 4, 2008

(51) Int. Cl.
*B32B 3/24* (2006.01)
(52) U.S. Cl. ............ 428/131; 264/171.1; 264/171.23
(58) Field of Classification Search ........... 428/131; 264/171.1, 171.23
See application file for complete search history.

(56) References Cited

U.S. PATENT DOCUMENTS

| | | | |
|---|---|---|---|
| 3,963,799 A | 6/1976 | Starkweather, Jr. | |
| 4,564,658 A | 1/1986 | Liu | |
| 5,123,778 A * | 6/1992 | Bohnhoff | 404/28 |
| 5,280,066 A | 1/1994 | Tekkanat et al. | |
| 6,296,924 B1 | 10/2001 | Bach | |
| 6,875,520 B2 | 4/2005 | Court et al. | |
| 2004/0102581 A1* | 5/2004 | Dang et al. | 525/333.7 |

FOREIGN PATENT DOCUMENTS

| | | | |
|---|---|---|---|
| EP | 0611849 A | 8/1994 | |
| WO | 9118150 A | 11/1991 | |

OTHER PUBLICATIONS

Alger, Mark "Polymer Science Dictionary", Chapman and Hall, New York, N.Y. Second Edition, 1997, pp. 106-107 and 236.*

* cited by examiner

*Primary Examiner*—William P Watkins, III
(74) *Attorney, Agent, or Firm*—Richard M. Klein; Fay Sharpe LLP

(57) ABSTRACT

Geotechnical article, and process for making it, the article having coefficient of thermal expansion less than about 150 ppm/° C. at ambient; resistance to acidic media greater than polyamide 6 resin and/or resistance to basic media greater than PET resin; resistance to hydrocarbons greater than that of HDPE; creep modulus of at least 400 MPa at 25° C., at 20% of yield stress load for 60 minutes (ISO 899-1); and 1 percent secant flexural modulus at least 700 MPa at 25° C. (ASTM D790); the article including a composition including (a) from about 1 to about 95% by weight of the composition of at least one functional group containing polymer or oligomer; and (b) from about 5 to about 99% by weight of the composition of at least one engineering thermoplastic, and optionally containing a filler and optionally containing an unmodified polyolefin, ethylene copolymer or ethylene terpolymer.

49 Claims, 7 Drawing Sheets

HIGH PERFORMANCE GEOSYNTHETIC ARTICLE

CROSS-REFERENCE TO RELATED APPLICATIONS

This application is related to U.S. patent application Ser. No. 11/680,961 currently pending, filed Mar. 1, 2007 and entitled "UV RESISTANT MULTILAYERED CELLULAR CONFINEMENT SYSTEM"; and to U.S. patent application Ser. No. 11/680,979 currently pending, filed Mar. 1, 2007 and entitled "GEOTECHNICAL ARTICLES"; to U.S. patent application Ser. No. 11/680,996 now U.S. Pat. No. 7,462,254, filed Mar. 1, 2007 and entitled "WELDING PROCESS AND GEOSYNTHETIC PRODUCTS THEREOF"; and to U.S. patent application Ser. No. 12/040,488 currently pending, filed Feb. 29, 2008 and entitled "PROCESS FOR PRODUCING COMPATIBILIZED POLYMER BLENDS", which claims priority to U.S. Provisional Patent Application Ser. No. 60/892,436, filed Mar. 1, 2007. All four of these patent applications are hereby incorporated by reference in their entirety.

BACKGROUND

The present disclosure relates to high performance geosynthetic articles, such as reinforcing strips, reinforcing elements, membranes and especially dimensionally stable cellular confinement systems. The present disclosure particularly relates to geosynthetic articles, characterized by structure and composition adapted to provide enhanced properties, formed of or comprising a compatibilized polymeric composition.

Plastic geotechnical reinforcing elements and articles, especially cellular confinement systems (CCSs) are used to increase the load bearing capacity, stability and erosion resistance of geotechnical reinforced materials (refer hereinafter as GRM) such as soil, rock, sand, stone, peat, clay, concrete, aggregate, road building materials, and earthen materials which are supported by the CCS.

CCSs are mostly manufactured from strips that include high density polyethylene (HDPE) or medium density polyethylene (MDPE), and are characterized by a honeycomb-like three dimensional cellular structure. The structure, when filled with a geotechnical material including, for example, soil, rock, sand, stone, peat, and clay, concrete, aggregate, road building and other earthen materials, or mixtures of these and/or other materials, such as fluids contained in the materials, provides reinforcement and stabilization both to the geotechnical materials and surrounding structures.

The CCS strengthens the GRM by increasing its shear strength and stiffness as a result of the hoop strength of the cell walls, the passive resistance of adjacent cells, and friction between the CCS and GRM. Under load, the CCS generates powerful lateral confinement forces and soil-cell wall friction. These mechanisms create a bridging structure with high flexural strength and stiffness. The bridging action improves the long-term load-deformation performance of common granular fill materials and allows dramatic reductions of up to 50% in the thickness and weight of structural support elements. CCSs may be used in load support applications such as road base stabilization, intermodal yards, under railroad tracks to stabilize track ballast, retaining walls, to protect GRM or vegetation, and on slopes and channels.

The term "HDPE" refers hereinafter to a polyethylene resin characterized by density from 0.941 to at least 0.960 g/cm$^3$, and the term "MDPE" refers to a polyethylene resin characterized by density from 0.926 to 0.940 g/cm$^3$.

The reinforced CCS is a composite structure, wherein the GRM is compressed and densified against the CCS walls and the friction between walls and GRM keep the integrity of the structure. The plastic cells and the GRM infill dynamically support each other and should be able to survive under a wide spectrum of loads, vibrations, impact loads, thermal stresses and erosion.

Three major factors affecting the long term effective durability of GRM-CCS composite structures are (1) the creep resistance of the plastic material; (2) the friction between cell wall and the geotechnical reinforced material (GRM) which is stabilized and reinforced within the CCS; and (3) the dimensional stability of the compacted GRM and the CCS.

Creep of the CCS wall causes loosening of the friction and loss of structural functionality of the CCS-GRM composite structure. HDPE and other polyolefins fail to resist creep, especially at temperatures higher than about 35-40 degrees Celsius (° C.). The situation with MDPE is even worse.

The potential to heat geotechnical articles, and particularly CCS, is usually correlated with hot areas on the globe. As used herein, in one embodiment, the term "hot areas" refers to areas located within 42 degrees latitude on either side (north or south) of the Earth's equator. In one embodiment, "hot areas" refers to areas located within 30 degrees latitude on either side of the Earth's equator. In particular, hot areas include regions along and in the desert belt. For example, North Africa, Southern Spain, Middle East, Arizona, Texas, Louisiana, Florida, Central America, Brazil, India, southern China, Australia and part of Japan may be considered hot areas. In general, such hot areas regularly experience temperatures above 35° C., or even above 40° C. Surfaces of plastic articles exposed to direct sun light may reach temperatures of 75° C. and even up to 90° C.

The mechanism of failure of CCS at elevated temperatures can be complex. The first step is the heating of the GRM surface and the exposed CCS surfaces—especially by absorption of sunlight. The increase of CCS temperature causes a dimensional change, since polyethylene (PE) has a high coefficient of thermal expansion (CTE)—about 150-200 parts per million per degree C. temperature change (ppm/° C.) and the CTE itself actually increases with increasing temperature. This means that 100 meters (m) of CCS will increase its length by about 60-80 centimeters (cm) when heating from 25° C. to 65° C. Since the GRM held by the CCS expands much less, the coupling between GRM and CCS, i.e., the ability of the CCS to hold the GRM, is deteriorated. In addition, when the CCS is exposed to heat for a few hours per day, the exposure leads to creep and irreversible expansion. The result is that even when temperatures fall, the intimate contact between the CCS and the GRM is irreversibly reduced and thus the combined structural integrity and performance are reduced or even lost. Thus, the repeated cycles of heating, expansion of the CCS, resultant spreading or collapse of the GRM structure previously contained by the CCS, results in eventual failure or significant loss of function of the CCS.

The situation becomes worse when the GRM is subjected to freezing and thawing of water during autumn and winter, a process that causes expansion of the GRM against the CCS. Since the creep resistance of HDPE and MDPE is medium or even low, the result is further loss of contact between CCS walls and GRM. This process is naturally occurring, for example a process in which stones are pushed up out of soil in winter, due to the cycles of freezing and thawing or, for example, freezing of water in cracked concrete or rock, leading to breaking of the concrete or rock.

The shear surfaces of the CCS structure and usually the walls of each cell, may be embossed, or provided with other means of friction-enhancement, in order to increase friction with GRM and prevent deformations of the wall so that the integrity of the composite structure is not ruptured.

Commercially available HDPE-based CCSs are characterized by moderate stiffness, moderate dimensional stability and acceptable creep resistance at temperatures in the range of about minus 10° to plus 40° C. These CCSs are however characterized by some drawbacks: They have moderate strength, high CTE, high tendency to creep, especially when temperatures are 40° C. and over, and chemical sensitivity to hydrocarbons and more specifically fuels and oils.

Chemical sensitivity to hydrocarbons is deleterious for applications wherein the CCS or membrane is subjected to fuels and oils, for example as GRM reinforcement or for confinement in landfills, oilfields, gas stations, intensive parking areas and chemical industry or as a barrier in landfills and reservoirs.

The limiting mechanical and chemical properties of HDPE and MDPE, and of course other polyolefins, are especially pertinent to creep resistance and limited thermal resistance as well as a high tendency to swell when exposed to hydrocarbon fluids. If one compares creep resistance and chemical resistance to hydrocarbon fluids, under the same load, between engineering thermoplastics ("ET"), such as between polyamide or polyester on one hand, and polyurethanes on the other, the engineering thermoplastic resin is by far more dimensionally stable, stiff, has a much lower tendency to creep, has much higher chemical resistance against fuels and organic fluids and higher strength.

In contrast to the ETs, polyethylene has better tear and puncture resistance than engineering thermoplastic—especially at temperatures below zero degrees Celsius. Tear strength and puncture resistance are important issues in membranes and CCSs, and even more important in perforated CCS wherein perforation provides drainage through the plastic wall, but weakens the strip and increases its sensitivity to tearing. Tear and puncture resistance is also important during installation wherein the CCS is still empty before filling with GRM, and needs to survive human activity related to installation and GRM filling.

The advantages of the engineering thermoplastic are even greater when properties are compared at temperatures above about 40-50° C. Since most CCS are manufactured by welding of a plurality of strips, the welding strength and rate of weld formation is better with engineering thermoplastic relative to HDPE or MDPE. Another advantage of engineering thermoplastic-based CCSs is the improved coefficient of friction with GRM and especially with soils and peat, compared with polyolefins, due to their higher polarity. Engineering thermoplastics are also more resistant against swelling by hydrocarbons such as fuels and oils.

The major limiting factors of engineering thermoplastics as the resin of choice in manufacturing of CCS, are a high modulus of elasticity, which affects installation simplicity, relative high cost, relatively higher sensitivity to acids and bases, relative brittleness at temperature below about 10° C. and a low melt strength that affects the simplicity of strip extrusion.

The combination of engineering thermoplastic resins and polyolefin resins in one blend, is described in several prior art patents.

U.S. Pat. No. 3,963,799 provides compositions of polyamide and polyolefin, adapted mostly for packaging industry and methods to form alloys (compatibilized blends) thereof. The compositions described in this patent are not applicable for structural geotechnical applications including CCSs, due to its inherent brittleness, especially at low temperatures, and lack of protection against humidity and UV light. This patent does not deal with either the difficulties in welding of the compositions, or the hydrolytic instability of the polyamide phase, which may be hydrolyzed in soil, especially acidic soils. Moreover, the compositions of this patent have CTE too high for CCS and membranes.

U.S. Pat. No. 4,564,658 provides compositions of polyester and linear low density polyethylene (LLDPE) only, and provides no compatibilizer, i.e., no agent to stabilize the dispersion of the two immiscible polymers. Consequently, in extrusion applications, for example extrusion of strips for geotechnical applications, flow of the melt is uneven (melt fracturing), and segregation between phases is observed. The compositions described in this patent are not applicable for structural geotechnical applications including CCSs, due to their flexibility and creep tendency. Due to the nature of LLDPE the compositions of this patent have CTE too high for CCS and membranes.

The patent also does not provide a solution for the protection of the blend from hydrolysis in soils and landfills, oils and hydrocarbons, and from the degradation induced by heat and UV light. Welding quality is not discussed.

U.S. Pat. No. 5,280,066 provides compositions of polyester, polyolefin and a functionalized styrenic elastomer for improved impact resistance, especially for injection molding. The invention is limited only to polypropylene (PP) as the polyolefin fraction. PP is too rigid and lacks the flexibility at temperatures below about zero ° C., a property that is mandatory in CCSs. The compositions of this patent have CTE too high for CCS and membranes.

The compatibilizer according to this patent is styrene based—thus has limited UV light resistance and thus limits the composition to indoor application or outdoor application with a lifetime of about 1 to 2 years. Polyester blends, especially when not specially stabilized against hydrolysis, may fail in soils, especially those having pH greater than 7, within a relatively short period of time. This patent does not provide sufficient protection against oils and fuels, acids and bases and UV light. Welding quality is not discussed.

U.S. Pat. No. 6,875,520 provides compositions of polyamide block copolymer and a very flexible polyolefin. This invention may be useful for flexible geomembranes but not for structural geotechnical applications including CCS and high performance membranes. The high flexibility that is an advantage in flexible geomembranes becomes a drawback in CCS: when a load is applied on the CCS supporting GRM, the composite structure of the two components interacts with the load as an integrated system. The CCS transfers the load from cell to cell by friction with the GRM which provides rigidity and stiffness. If the CCS is too flexible, the load induces a deformation of the CCS until friction with the GRM is lowered. At that specific state, the integrated system is irreversibly damaged and can no longer provide the required durability, stiffness and stabilization to the GRM. The patent does not provide a solution to the hydrolysis of the composition in soils and landfills, or when exposed to concrete or other media characterized by pH of greater than 7. The compositions of this patent have CTE too high for CCS and membranes.

UV and heat stability, especially for extended periods of 2 years or more, that are required from CCSs, are not discussed or provided as well.

There thus exists a long felt need to provide an improved polymeric composition, particularly as compared to HDPE and MDPE, characterized by having improved properties, such as one or more of creep resistance at a wide range of temperatures, such as temperatures in the range of minus 70° to plus 90° C., being stronger and stiffer, having lower CTE and lower tendency to lose its stiffness at elevated temperatures, having higher resistance to creep during freeze/thaw/ heating of GRM, being more resistant to swelling by low molecular weight materials such as oils and hydrocarbons, having greater resistance to UV light and thermal degradation for periods of about 2 to about 100 years in a wide spectrum of climates ranging from arid to arctic and having improved welding strength and weld load bearing resistance. Such improved polymeric compositions would be desirable for CCS for high performance applications and for reinforcing GRM comprising oils, acids and bases, aggressive chemicals, solvents and fuels. In addition there is a need for improved geotechnical articles such as geomembranes and geogrids, having improved properties important to the applications to which such articles are put. The need for such compositions and materials made therefrom has remained unmet until now.

BRIEF DESCRIPTION

According to one embodiment of the present disclosure, a geotechnical article is provided, including at least one layer, the at least one layer may have a coefficient of thermal expansion less than about 150 ppm/° C. at ambient temperature; resistance to acidic media greater than polyamide 6 resin and/or resistance to basic media greater than PET resin; resistance to hydrocarbons greater than that of HDPE; tensile creep modulus (referred to hereinafter as creep modulus) of at least 400 MPa at 25° C., at a load of 20% of yield stress and loading time of 60 minutes, according to ISO 899-1; and 1 percent secant flexural modulus of at least 700 MPa, at 25° C. according to ASTM D790; the at least one layer may be formed of a composition comprising:

(a) from about 1 to about 94.5% by weight of the composition of at least one functional group containing polymer or oligomer comprising on average at least one functional group per molecule, the at least one functional group selected from carboxyl, anhydride, oxirane, amino, amido, ester, oxazoline, isocyanate or any combination thereof;

(b) from about 5 to about 98.5% by weight of the composition of at least one engineering thermoplastic;

(c) from about 0.5 to about 94% by weight of the composition of at least one filler; and (d) optionally, up to about 93.5% by weight of an unmodified polyolefin, ethylene copolymer or ethylene terpolymer.

In any composition or article of the present disclosure, the filler may be in a form of a powder, whiskers or fibers, and wherein when in the form of a powder has an average particle size less than about 30 microns. In any composition or article of the present disclosure, the present disclosure, the content of (b) may be from about 90 weight percent to about 10 weight percent. In any composition or article of the present disclosure, the (c) at least one filler may comprise a metal oxide, a metal carbonate, a metal sulfate, a metal phosphate, a metal silicate, a metal borate, a metal hydroxide, a silica, a silicate, an aluminate, an alumo-silicate, chalk, talc, dolomite, an organic or inorganic fiber or whisker, a metal, metal-coated inorganic particles, clay, kaolin, industrial ash, concrete powder, cement, dolomite, wollastonite or a mixture of any two or more thereof.

In any composition or article of the present disclosure, the at least one engineering thermoplastic is selected from (i) a polyamide; (ii) a polyester; (iii) a polyurethane; or copolymers, block copolymers, blends or combinations of any two or more of (i), (ii) and (iii).

In any composition or article of the present disclosure, the functional group containing polymer or oligomer may be a modified polyolefin, ethylene copolymer or ethylene terpolymer, wherein the functional group is grafted to the polymer or oligomer.

In any composition or article of the present disclosure, the functional group containing polymer or oligomer may be a copolymer or terpolymer of (1) at least one unsaturated monomer and (2) at least one functional group containing unsaturated monomer, wherein the functional group containing unsaturated monomer contains at least one unsaturated group and at least one the functional group.

In any composition or article of the present disclosure, the at least one functional group containing polymer or oligomer may be selected from a maleic anhydride grafted polyethylene, a maleic anhydride grafted ethylene-acrylic or methacrylic ester copolymer or terpolymer, a maleic anhydride grafted propylene homopolymer or copolymer, a maleic anhydride grafted ethylene-alpha olefin polymer, a maleic anhydride grafted ethylene-propylene rubber, a glycidyl methacrylate or acrylate (GMA) grafted polyethylene, a GMA grafted ethylene-acrylic or methacrylic ester co-polymer or terpolymer, a GMA grafted propylene homopolymer or copolymer, a GMA grafted ethylene-alpha olefin polymer, a GMA grafted ethylene-propylene rubber, an acrylic or methacrylic acid grafted ethylene copolymer or terpolymer, an acrylic and methacrylic acid ionomer, a styrene-maleic anhydride copolymer or terpolymer, a styrene-acrylic acid or styrene-methacrylic acid copolymer or terpolymer, a copolymer or terpolymer of ethylene-glycidyl methacrylate or ethylene-glycidyl acrylate, or any combination thereof.

In any composition or article of the present disclosure, the (d) unmodified polyolefin, ethylene copolymer or ethylene terpolymer, when present, may be independently selected from polyethylene, ethylene-vinyl acetate, polypropylene, ethylene-alpha olefin elastomer, ethylene-propylene elastomer, ethylene-propylene diene elastomer, ethylene-acrylate ester or methacrylate ester copolymer or terpolymer, or any copolymer or combinations thereof In any composition or article of the present disclosure, the composition may further comprise an additive selected from heat stabilizer, hindered amine light stabilizer (HALS), organic UV absorber, inorganic UV absorber, hydrolysis inhibitor or a combinations thereof.

In any composition or article of the present disclosure, the hydrolysis inhibitor may be reactive with end or side groups of the at least one engineering thermoplastic and is one or more selected from a carbodiimide, a poly-carbodiimide, a blocked isocyanate, an epoxy resin, a phenolic resin, a novolac resin, a melamine resin, a urea resin, a glycoluril resin, tri-isocyanuric acid and derivatives thereof, a styrene-maleic anhydride resin, or an aromatic or cycloaliphatic diacid or an anhydride thereof.

In any composition or article of the present disclosure, the composition may further comprise nano-size particles characterized by barrier properties, and permeability of the composition to molecules having a molecular weight lower than about 1000 Daltons is at least 10 percent lower as compared with a composition comprising a same composition but without the nano-size particles.

In any composition or article of the present disclosure, the nano-size particles may be selected from nano-clay, nano-silica, nano-silicates, nano-alumosilicates, nano-zinc oxide, nano-titanium oxides, nano-zirconium oxides, nano-talc, nano-tubes, nano-metal particles and/or flakes, carbon black, nano size sulfides and sulfates and nano-size plant or animal originated cellulose, lignin or proteins and combinations of any two or more thereof.

In any composition or article of the present disclosure, the article may include an extruded or molded strip having a thickness in the range from about 0.1 mm to about 5 mm. In any composition of the present disclosure, the strip, having a given size, may have at least 10% greater pullout force at normal stress of 4 lb/in$^2$ (about 27.58 kPa), between the strip and sand, relative to a strip of the given size formed of virgin MDPE or HDPE, as tested by ASTM D6706-01. In any composition of the present disclosure, the strip may include friction-promoting features on at least one outer surface of the article, wherein the friction-promoting features comprise texture, embossment, debossment, through-hole, finger-like extension, hair-like extension, wave-like extension, co-extruded line, bonded fibers or grains or aggregate, dots, flaps matte or any combination thereof.

In any composition or article of the present disclosure, the geotechnical article may be a three dimensional cellular confinement system (CCS) comprising a plurality of the strips, each of the strips communicating with its neighboring in a side by side relationship via discrete physical joints, wherein the joints are spaced one from the other by nonjoined areas. In any of the compositions of the present disclosure, the three dimensional CCS may be adapted for containment and/or confinement and/or reinforcement of earthen material, soil, rock, gravel, sand, stone, peat, clay, concrete, aggregate, road building materials and any combination of two or more thereof. In any composition or article of the present disclosure, the distance between the joints may be in the range of about 50 mm to about 1500 mm. In any composition or article of the present disclosure, the joints may be provided by welding, bonding, sewing, stapling, riveting or any by combination thereof. In any composition or article of the present disclosure, the joints may be welded by one or more of ultrasonic welding, laser welding and hot-press welding. In any composition or article of the present disclosure, the welding may require at least 10% shorter cycle time of welding relative to virgin HDPE for a same weld dimension. In any composition or article of the present disclosure, wherein the joints are welded, the ultimate weld strength of two welded strips at ambient temperature may be greater than about 1300 N for a weld width of 100 mm, measured at least 48 hours after welding. In any composition or article of the present disclosure, wherein the joints are welded, the ultimate weld strength of two welded strips at minus 20° C. may be greater than about 1000 N for a weld width of 100 mm, measured at least 48 hours after welding. In any composition or article of the present disclosure, wherein the joints are welded, the ultimate weld strength of two welded strips at plus 70° C. may be greater than about 1000 N for a weld width of 100 mm, measured at least 48 hours after welding.

In any composition or article of the present disclosure, wherein two strips are joined by welding, when the welded joints are subjected to a continuous load of 77 Kg per 100 mm weld length for 10 days at ambient temperature, substantially all of the welded joints should remain intact.

In any composition or article of the present disclosure, wherein two strips are joined by welding, when the welded joints are subjected to a continuous load of 77 Kg per 100 mm weld length for 30 days at ambient temperature, substantially all of the welded joints should remain intact.

In any composition or article of the present disclosure, wherein two strips are joined by welding, when the welded joints are subjected to a continuous load of 88 Kg per 100 mm weld length for 20 days at ambient temperature, about 90% or more of the welded joints should remain intact.

In any composition or article of the present disclosure, wherein two strips are joined by welding, when the welded joints are subjected to a continuous load of 88 Kg per 100 mm weld length for 30 days at ambient temperature, about 80% or more of the welded joints should remain intact.

In any composition or article of the present disclosure, wherein two strips are joined by welding, when the welded joints are subjected to a continuous load of 100 Kg per 100 mm weld length for 10 days at ambient temperature, substantially all of the welded joints should remain intact.

In any composition or article of the present disclosure, wherein two strips are joined by welding, when the welded joints are subjected to a continuous load of 100 Kg per 100 mm weld length for 20 days at ambient temperature, about 80% or more of the welded joints should remain intact.

In any composition or article of the present disclosure, wherein two strips are joined by welding, when the welded joints are subjected to a continuous load of 100 Kg per 100 mm weld length for 30 days at ambient temperature, about 60% or more of the welded joints should remain intact.

In any composition or article of the present disclosure, wherein two strips are joined by welding, when the welded joints are subjected to a continuous load of 88 Kg per 100 mm weld length for 30 days at −20° C., about 70% or more of the welded joints should remain intact.

In any composition or article of the present disclosure, wherein two strips are joined by welding, when the welded joints are subjected to a continuous load of 88 Kg per 100 mm weld length for 30 days at +70° C., about 60% or more of the welded joints should remain intact.

In any composition or article of the present disclosure, the article may further comprise a reinforcing structure adapted for use in attaching the article to a substrate.

In any composition or article of the present disclosure, the composition or article may have a 1% secant modulus according to ASTM D790 of at least 600 MPa when measured at 45° C.

In any composition or article of the present disclosure, the composition or article may have a 1% secant modulus according to ASTM D790 of at least 500 MPa when measured at 70° C.

In any composition or article of the present disclosure, the composition or article may have a 1 percent secant flexural modulus according to ASTM D790 that is at least 10% greater than that of HDPE, when measured at a temperature of about 45° C.

In any composition or article of the present disclosure, the composition or article may have a 1 percent secant flexural modulus according to ASTM D790 that is at least 10% better than that of HDPE, when measured at a temperature of about 70° C.

In any composition or article of the present disclosure, the article may have at least one additional layer applied to or coextruded or co-molded or laminated with the first layer. In any composition or article of the present disclosure, the at least one additional layer may comprise (1) a composition comprising the (a), (b) and (c) (as defined above) in a combination which may be the same as or different from the composition of the first layer, or (2) a material different from the composition comprising the (a), (b) and (c). In any embodiment of the present disclosure, the article may be a geomembrane.

In any such geomembrane, the geomembrane may comprise a plurality of sheets welded or bonded together at respective edges thereof. In any such geomembrane, the geomembrane may comprise a sheet having one or more of (a) lower permeability to one or more of acids, bases, oils, fuels, heavy metals, dioxins, oxygen, nitrates, sulfates, phosphates, $SO_x$, $NO_x$, chlorofluorocarbons, organophosphorus compounds, herbicides, pesticides, germicides, halogens, halogen acids, chlorine and its organic derivatives, bromine and its organic derivatives, ammonia, ammonium salts and organic derivatives, benzene and organic derivatives, toluene organic derivatives, phenol organic derivatives, radioactive compounds, chemical warfare agents, bacteria, viruses, fungi, algae, and organic solvents relative to a HDPE geomembrane having same dimensions; (b) at least 10% better retention of elastic modulus at 25° C. according to ASTM D790 when exposed to fuels and hydrocarbons relative to a HDPE geomembrane having same dimensions; and (c) at least 10% higher creep modulus at a load of 20% of yield stress and loading time of 60 minutes, according to ISO 899-1 measured at 60° C., relative to a HDPE geomembrane having same dimensions.

In any composition or article of the present disclosure, the at least one layer may provide at least 10% greater thermal conductivity relative to a layer of HDPE having the same dimensions.

In any composition or article of the present disclosure, the at least one layer may further comprise an additive selected from a HALS, an organic UV absorber or an inorganic UV absorber or any combination thereof, the layer provides at least 10% lower extraction, evaporation and/or hydrolysis rate of the additive relative to a layer of HDPE comprising the same additive and having the same dimensions.

In any composition or article of the present disclosure, the at least one layer may exhibit at least a 10% lower weight increase after immersion for 60 days at 25° C. in n-octane relative to a layer of HDPE having the same dimensions.

In any composition or article of the present disclosure, the at least one layer may exhibit at least 10% better retention of elongation to break after immersion for 60 days at 45° C. in aqueous solution having pH=11 relative to a layer of polyethylene terephthalate (PET) having the same dimensions.

In any composition or article of the present disclosure, the at least one layer may exhibit at least 10% better retention of elongation to break after immersion for 60 days at 45° C. in aqueous solution having pH=4 relative to a layer of PA6 having the same dimensions.

In any composition or article of the present disclosure, the composition may comprise a continuous phase and a discontinuous phase dispersed in domains throughout the continuous phase, wherein substantially all of the domains have a largest dimension of about 10 microns or less. In any composition or article of the present disclosure, substantially all of the domains may have a largest dimension of about 3 microns or less.

In any composition or article of the present disclosure, the geotechnical article may be a CCS, a geomembrane or a geogrid.

In accordance with an embodiment of the present disclosure, there is provided a process for forming a geotechnical article comprising at least one layer, the at least one layer having a coefficient of thermal expansion less than about 150 ppm/° C. at ambient temperature; resistance to acidic media greater than polyamide 6 resin and/or resistance to basic media greater than PET resin; resistance to hydrocarbons greater than that of HDPE; creep modulus of at least 400 MPa at 25° C., at a load of 20% of yield stress and loading time of 60 minutes, according to ISO 899-1; and 1 percent secant flexural modulus of at least 700 MPa, at 25° C. according to ASTM D790; in which the at least one layer may be formed of a composition comprising:

(a) from about 1 to about 94.5% by weight of the composition of at least one functional group containing polymer or oligomer comprising on average at least one functional group per molecule, the at least one functional group selected from carboxyl, anhydride, oxirane, amino, amido, ester, oxazoline, isocyanate or any combination thereof;

(b) from about 5 to about 98.5% by weight of the composition of at least one engineering thermoplastic;

(c) from about 0.5 to about 94% by weight of the composition of at least one filler; and (d) optionally, up to about 93.5% by weight of an unmodified polyolefin, ethylene copolymer or ethylene terpolymer; as described herein, and in which the process comprises:

(i) providing the (a) at least one functional group containing polymer or oligomer and the (b) at least one engineering thermoplastic;

(ii) melt kneading the combined (a) and (b);

(iii) adding the (c) at least one filler and further melt kneading the combined (a), (b) and (c);

(vi) optionally adding the (d) at least one unmodified polyolefin, ethylene copolymer or ethylene terpolymer to any of the (a), (b) or (c) or combination thereof; and (v) extruding the composition into a strip, a profile, a film or sheet, a powder, or a plurality of beads, flakes, granules or pellets.

In any process in accordance with the present disclosure, the process may further include remelting the powder or the plurality of beads, flakes, granules or pellets and extruding, molding or forming the remelt into a strip, a profile, a film, a sheet or a molded three-dimensional geotechnical article.

In one embodiment, the filler (c) is provided together with (a) and (b) from the same aperture or hopper into the extruder or as a pre-blend.

In any process in accordance with the present disclosure, the process may produce or form a geotechnical article which is a CCS, a geomembrane or a geogrid, or any form of extruded or molded profile or article.

In accordance with an embodiment of the present disclosure, there is provided a process for forming a geotechnical article comprising at least one layer, the at least one layer having a coefficient of thermal expansion less than about 150 ppm/° C. at ambient temperature; resistance to acidic media greater than polyamide 6 resin and/or resistance to basic media greater than PET resin; resistance to hydrocarbons greater than that of HDPE; creep modulus of at least 400 MPa at 25° C., at a load of 20% of yield stress and loading time of 60 minutes, according to ISO 899-1; and 1 percent secant flexural modulus of at least 700 MPa, at 25° C. according to ASTM D790; in which the at least one layer may be formed of a composition comprising:

(a) from about 1 to about 94.5% by weight of the composition of at least one functional group containing polymer or oligomer;

(b) from about 5 to about 98.5% by weight of the composition of at least one engineering thermoplastic;

(c) from about 0.5 to about 94% by weight of the composition of at least one filler; and (d) optionally, up to about 93.5% by weight of an unmodified polyolefin, ethylene copolymer or ethylene terpolymer; as described herein, in which the process comprises:

(i) providing a polyolefin, ethylene copolymer, ethylene terpolymer or any combination thereof;

(ii) melt kneading the polyolefin, ethylene copolymer, ethylene terpolymer or any combination thereof with an unsaturated monomer comprising at least one reactive group per molecule, wherein the reactive group is a carboxyl, anhydride, oxirane, amino, amido, ester, oxazoline, isocyanate or a combinations thereof, in the presence of free radicals to form the (a) at least one functional group containing polymer or oligomer;

(iii) combining the (a) functional group containing polymer or oligomer with the (b) at least one engineering thermoplastic;

(iv) melt kneading the combined (a) and (b);

(v) adding the (c) at least one filler and further melt kneading the combined (a), (b) and (c);

(v) optionally adding the (d) at least one unmodified polyolefin, ethylene copolymer or ethylene terpolymer to any of the (a), (b) or (c) or combination thereof; and (vi) extruding or molding the composition into a strip, a film or sheet, a powder, a profile, or a plurality of beads, flakes, granules or pellets.

In any process in accordance with this embodiment of the present disclosure, (i) and (ii) may be carried out in a first extruder and the (iii), (iv), (v), (vii), and (vi) if present, may be carried out in a second extruder.

In any process in accordance with this embodiment of the present disclosure, (i)-(vii), and (vi) if present, may be carried out in a same extruder in order.

In one embodiment, the functional group containing polymer is provided in a first sector of an extruder, and the ET is provided as powder, flakes or melt to the molten functional group containing polymer, in a second sector of the same extruder In another embodiment, the functional group containing polymer is provided in a first sector of an extruder, and the ET is provided as a melt to the molten functional group containing polymer, by a side extruder coupled to the first extruder. The mixture of two melts is melt kneaded in a second sector of one of the two extruders or in a third extruder.

In any embodiment of the present disclosure, the filler may be omitted. Thus, any of the foregoing compositions may be formed without the use of an added filler, and any of the foregoing processes may be carried out without the addition of a filler. In one embodiment, the nano-sized materials are not considered to constitute a filler.

In one embodiment of the present disclosure, the compatibilized blend provides improved weldability to articles and especially strips formed from the compatibilized blend, relative to a non-compatibilized HDPE or MDPE molded or extruded article and especially strips of the same dimensions. The improved weldability refers to faster weld formation and/or higher ultimate weld strength and/or weld ability to retain its integrity under load for prolonged periods. The improved weld strength is significantly better when compared to HDPE and MDPE at temperature greater than 45° C. The improved weldability is provided when the article, and especially a strip, includes a compatibilized blend filled with filler according to the present disclosure.

In one embodiment, the improved weldability of the compatibilized blend is particularly apparent when the welding is ultrasonic welding. Due to the effect of the compatibilized blend, strips or other articles formed of the compatibilized blend, when welded, provide very strong bonds between the welded parts. The bond strength obtained when articles formed from the compatibilized blend of the present disclosure are welded together is stronger than the bonds obtained when prior art articles that are similar but made of HDPE or MDPE.

Thus the present disclosure addresses the long felt need for an improved polymeric composition, as compared to HDPE and MDPE, characterized by having improved characteristics, such as one or more of improved creep resistance at temperatures in the range of minus 70° to plus 90° C., being stronger and stiffer, having lower CTE and lower tendency to lose its stiffness at elevated temperatures, higher resistance to creep during freezing of GRM, being more resistant to swelling by oils and hydrocarbons, being more resistant to acids and bases, having greater resistance to UV light induced degradation and thermal degradation, for periods of about 2 to about 100, years in a wide spectrum of climates ranging from arid to arctic, and having improved welding strength and long term load bearing. The compatibilized polymeric compositions of the present disclosure are very desirable for CCS for high performance applications and for reinforcing GRM comprising oils, acids and bases, aggressive chemicals, solvents and fuels, and thus represent a significant improvement over the prior art.

BRIEF DESCRIPTION OF THE DRAWINGS

The following is a brief description of the drawings, which are presented for the purposes of illustrating the exemplary embodiments disclosed herein and not for the purposes of limiting the same.

Figure 1:
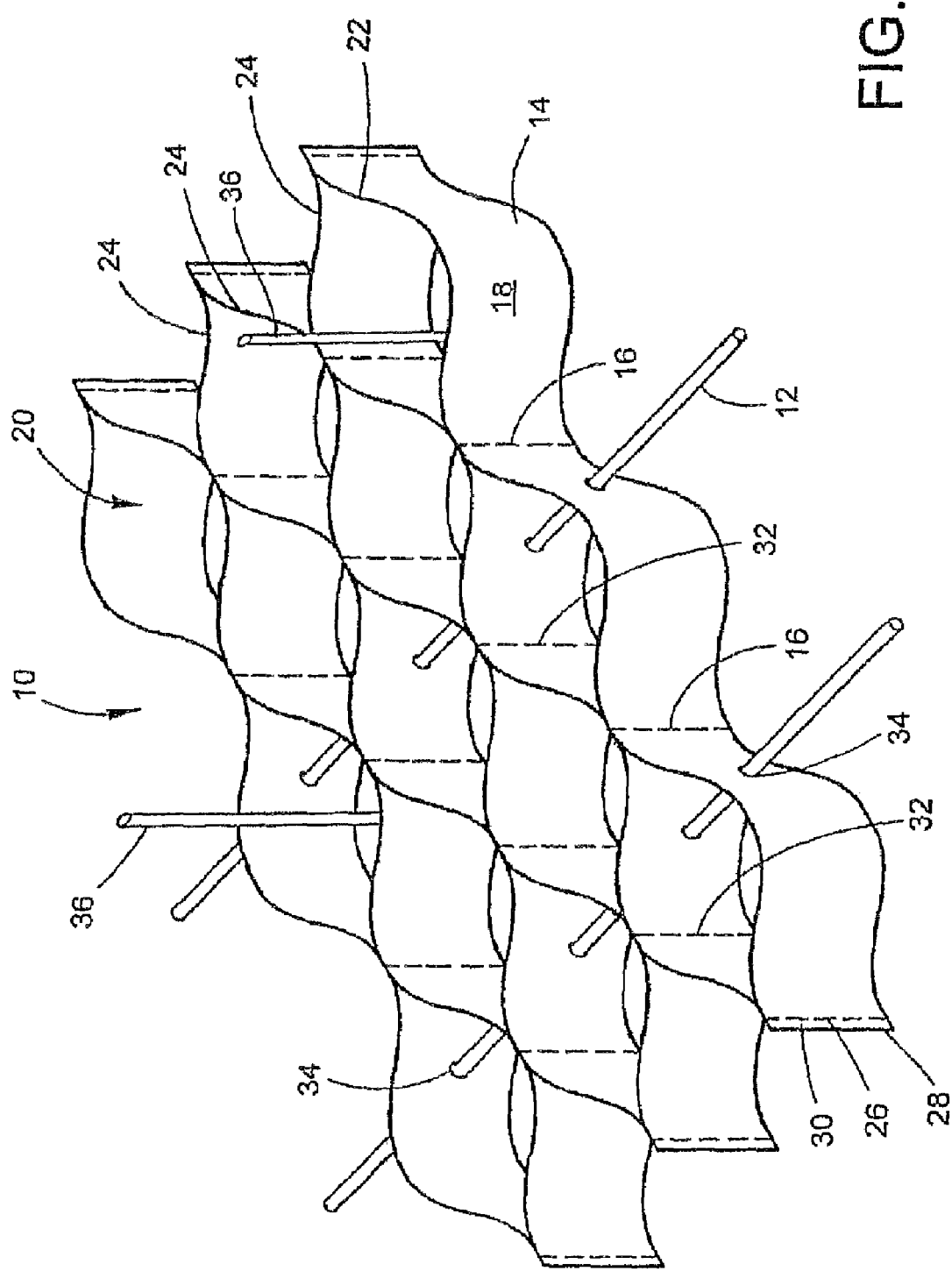
FIG. 1 is a perspective view of a CCS including a plurality of welded strips, wedges and tendons, in accordance with an embodiment of the present disclosure.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

The physical properties mentioned herein are measured at ambient temperature, i.e., about 200 to about 25° C., unless specifically stated otherwise.

The following description of the present disclosure is provided, together with the drawings and claims, so as to enable a person skilled in the art to make and use the invention and sets forth the best mode contemplated by the inventor of carrying out this invention. Various modifications, however, will remain apparent to those skilled in the art, since the general principles of the present disclosure have been defined specifically to provide compositions, a molded or extruded article, and in particular, strips, which can be formed into a CCS especially adapted for geotechnical applications. In one embodiment, the article in accordance with this invention has an improved creep resistance at temperatures in the range of minus 70° to plus 90° C. and 1 percent secant flexural modulus according to ASTM D790 of at least 700 MPa. In one embodiment, the article or a layer used to form the article, has one or more of a coefficient of thermal expansion less than about 150 ppm/° C. at ambient temperature; resistance to acidic media greater than polyamide 6 resin and/or resistance to basic media greater than PET resin; resistance to hydrocarbons greater than that of HDPE; creep modulus of at least 400 MPa at 25° C., at a load of 20% of yield stress and loading time of 60 minutes, according to ISO 899-1; and 1 percent secant flexural modulus of at least 700 MPa, at 25° C. according to ASTM D790.

The blend, the molded or extruded article, and especially the strips or CCS formed therefrom, typically includes at least one layer wherein the layer includes (a) from about 1 to about 94.5% by weight of the composition of at least one functional group containing polymer or oligomer comprising on average at least one functional group per molecule, the at least one functional group selected from carboxyl, anhydride, oxirane, amino, amido, ester, oxazoline, isocyanate or any combination thereof; (b) from about 5 to about 98.5% by weight of the composition of at least one engineering thermoplastic; (c) from about 0.5 to about 94% by weight of the composition of at least one filler; and (d) optionally, up to about 93.5% by weight of an unmodified polyolefin, ethylene copolymer or ethylene terpolymer. In one embodiment, the filler (c) may be omitted, and so is optional in this embodiment. In an embodiment in which the filler is optional, the composition may be described as comprising (a) from about 1 to about 95% by weight of the composition of at least one functional group containing polymer or oligomer comprising on average at least one functional group per molecule, said at least one functional group selected from carboxyl, anhydride, oxirane, amino, amido, ester, oxazoline, isocyanate or any combination thereof; (b) from about 5 to about 99% by weight of the composition of at least one engineering thermoplastic; (c) optionally up to about 94% by weight of the composition of at least one filler; and (d) optionally, up to about 94% by weight of an unmodified polyolefin.

In one embodiment, the compatibilized polymeric composition is characterized by creep modulus of at least 400 MPa at 25° C., at a load of 20% of yield stress and loading time of 60 minutes, according to ISO 899-1. Most polyolefins have creep modulus lower than the values disclosed herein for the geotechnical article of the present disclosure, and thus may cause premature CCS failure, usually by a plastic deformation mode, especially under combinations of high loads and temperatures of 40° C. or more.

In another embodiment, the novel compatibilized polymeric composition is characterized by tear strength according to ASTM D1004 of at least about 30 Newtons (N) for film thickness of 1 mm.

Most engineering thermoplastic does not have sufficient tear and puncture resistance, and thus may cause to catastrophic failure of CCS formed by such material.

Moreover, alloys of PO and ET tend to be brittle and their tear resistance is insufficient for geotechnical applications. Surprisingly, when a balanced composition of PO including a significant amount of relatively elastic polyolefin in the form of a compatibilizer as defined herein is introduced to the blend (alloy) of PO and ET, the tear strength is improved so that geotechnical applications are enabled for the composition.

As used herein, the term "compatibilizer" means a functional group-containing polymer or oligomer, for example, a copolymer or terpolymer comprising an average of at least one reactive group per chain, or modified polyolefin or ethylene copolymer or ethylene terpolymer, that contains, is grafted by and/or is functionalized by a functional group and comprising an average of at least one reactive group per chain. The compatibilizer thus includes an average of at least one functional group per one polymer or oligomer chain, i.e., a polymer or oligomer modified by an average of at least one reactive group per chain.

The term "functional group-containing polymer or oligomer" refers herein either or both to a copolymer or oligomer which contains "mer" units derived from functional group containing monomers, or to a polymer, copolymer or oligomer which has been functionalized by, e.g., grafting of a functional group-containing moiety to the chain or backbone of the polymer, copolymer or oligomer. In both cases, the functional group may be one or more of carboxyl, anhydride, oxirane, amino, amido, ester, oxazoline, isocyanate or combinations thereof. The term "functionalized" or "functional group containing" refers to any product in which the reactive groups are covalently linked with the polymer or oligomer chains. As described herein, the functional group may be introduced by grafting to a previously formed polymer or oligomer, or by copolymerizing one or more functional group containing monomer with one or more nonfunctional group containing monomer, to form a copolymer or terpolymer in which the functional group containing monomer is included in the main chain or backbone of the polymer or oligomer.

The term "self compatibilizer" refers herein to a modified polymer (a compatibilizer) derived from an unmodified polyolefin or ethylene copolymer or ethylene terpolymer, in which the unmodified polymer is grafted or functionalized by a functional group containing reactant, and in which the grafting or functionalizing takes place in situ, just prior to the step of melt kneading of the self compatibilizer and, optionally, any additional unmodified polyolefin or ethylene copolymer or ethylene terpolymer, with the engineering thermoplastic component. The functional group may be a group reactive with a component of the engineering thermoplastic component. The term "in situ" means the molten self compatibilizer is mixed with the engineering thermoplastic component direct after its manufacturing, with no cooling step between.

The term "external compatibilizer" refers herein to a compatibilizer (as defined above) that is either commercially obtained or that has been formed by grafting a functional group-containing reactant to a suitable unmodified polyolefin or ethylene copolymer or ethylene terpolymer, and in which the grafting takes place prior to the time the compatibilizer is introduced to a blend comprising the engineering thermoplastic and, optionally, unmodified polyolefin or ethylene copolymer or ethylene terpolymer. The external compatibilizer is provided as solid pellets or powder or flakes or any other shape to, together with the solid engineering thermoplastic and, optionally, solid unmodified polyolefin or ethylene copolymer or ethylene terpolymer, and the mixture is melted and then melt kneaded.

In one embodiment, a composition in accordance with the present disclosure is made by: introducing into an extruder an unmodified polymer, an unsaturated functional group-containing reactant and a free radical initiator; first melt kneading these materials so that the reactant reacts with the polymer to graft the functional group to the polymer chain thereby forming a self compatibilizer; introducing into the extruder a molten engineering thermoplastic; melt kneading the self compatibilizer with the engineering thermoplastic downstream in the same extruder or in a secondary extruder; optionally adding additional unmodified polymer after the first melt kneading and either before or after introducing the engineering thermoplastic and further melt kneading if after; and extruding the composition through a die to form a strip, a profile, a three dimensional article, a film or sheet, a powder, or a plurality of beads, flakes, granules or pellets.

In any embodiment in which the unmodified polyolefin, ethylene copolymer or ethylene terpolymer (PO) phase is present, the PO provides the composition with hydrolytic stability (especially against acids and bases that attack the ET), tear and puncture resistance, and provides these benefits at a range of temperatures, but especially at temperatures below zero degrees C., and provides high melt strength, which is a very important parameter in extrusion and blow molding.

The engineering thermoplastic (ET) phase provides the composition with stiffness, strength, dimensional stability, resistance to creep at temperatures greater than about 40° C., resistance against oils and fuels and improved barrier properties against diffusion of different materials through the molded or extruded article, improved coefficient of friction (important for welding and for friction with GRM), lower coefficient of thermal expansion (CTE) than the PO and higher barrier properties that enables slower diffusion of harmful compounds through the polymer article and slower extraction or evaporation of HALS and UV absorbers.

Unless otherwise noted, the properties of the polymers described hereinafter are measured at ambient temperature, e.g., about 20° to about 25° C., and at atmospheric pressure conditions.

In one embodiment of the present disclosure, there is provided a compatibilized polymeric composition suitable for geotechnical applications, including CCS, geogrid, geomembrane and soil reinforcement, characterized by high creep resistance at temperatures in the range of minus 70° to plus 90° C., high resistance against degradation induced by ultraviolet (UV) light and heat and stiffness suitable for the applications of 1% secant flexural modulus according to ASTM D790 of at least 700 MPa, measured at ambient temperature. In one embodiment, the compatibilized polymeric composition of the present disclosure has a 1% secant modulus according to ASTM D790 of at least 600 MPa when measured at 45° C., and in another embodiment, the compatibilized polymeric composition of the present disclosure has a 1% secant modulus according to ASTM D790 of at least 500 MPa when measured at 70° C. In one embodiment, the polymeric composition has a 1 percent secant flexural modulus according to ASTM D790 that is at least 10% greater than that of HDPE, when measured at a temperature of about 45° C., and in another embodiment the polymeric composition has a 1 percent secant flexural modulus according to ASTM D790 that is at least 10% better than that of HDPE, when measured at a temperature of about 70° C. In one embodiment, the compatibilized polymeric composition has a 1 percent secant flexural modulus according to ASTM D790 that is at least 25% greater than that of HDPE, when measured at a temperature of about 45° C., and in another embodiment the compatibilized polymeric composition has a 1 percent secant flexural modulus according to ASTM D790 that is at least 25% better than that of HDPE, when measured at a temperature of about 70° C.

In one embodiment, the present disclosure provides a geotechnical article includes at least one layer, in which the at least one layer has properties including one or more of a coefficient of thermal expansion less than about 150 ppm/° C. at ambient temperature; resistance to acidic media greater than polyamide 6 resin and/or resistance to basic media greater than PET resin; resistance to hydrocarbons greater than that of HDPE; creep modulus of at least 400 MPa at 25° C. at a load of 20% of yield stress and loading time of 60 minutes, according to ISO 899-1; and 1 percent secant flexural modulus of at least 700 MPa at 25° C., according to ASTM D790.

In one embodiment, the at least one layer may be formed of a composition including (a) from about 1 to about 94.5% by weight of the composition of at least one functional group containing polymer or oligomer comprising on average at least one functional group per molecule, said at least one functional group selected from carboxyl, anhydride, oxirane, amino, amido, ester, oxazoline, isocyanate or any combination thereof; (b) from about 5 to about 98.5% by weight of the composition of at least one engineering thermoplastic; (c) from about 0.5 to about 94% by weight of the composition of at least one filler; and (d) optionally, up to about 93.5% by weight of an unmodified polyolefin, ethylene copolymer or ethylene terpolymer.

In another embodiment, the at least one layer may be formed of a composition including (a) from about 1 to about 95% by weight of the composition of at least one functional group containing polymer or oligomer comprising on average at least one functional group per molecule, said at least one functional group selected from carboxyl, anhydride, oxirane, amino, amido, ester, oxazoline, isocyanate or any combination thereof; (b) from about 5 to about 99% by weight of the composition of at least one engineering thermoplastic; (c) optionally up to about 94% by weight of the composition of at least one filler; and (d) optionally, up to about 94% by weight of an unmodified polyolefin. In one embodiment, the content of (b) is from about 90 weight percent to about 10 weight percent. In one embodiment, the at least one engineering thermoplastic is selected from (i) a polyamide; (ii) a polyester; (iii) a polyurethane; or copolymers, block copolymers, blends or combinations of any two or more of (i), (ii) and (iii).

In one embodiment, when present, the filler is in the form of a powder, whiskers or fibers, and in one embodiment, when in the form of a powder has an average particle size less than about 30 microns. In one embodiment, the filler may include a metal oxide, a metal carbonate, a metal sulfate, a metal phosphate, a metal silicate, a metal borate, a metal hydroxide, a silica, a silicate, an aluminate, an alumo-silicate, chalk, talc, dolomite, an organic or inorganic fiber or whisker, a metal, metal-coated inorganic particles, clay, kaolin, industrial ash, concrete powder, cement, dolomite, wollastonite or a mixture of any two or more thereof.

In one embodiment, the functional group containing polymer or oligomer is a modified polyolefin, ethylene copolymer or ethylene terpolymer, wherein the functional group is grafted to the polymer or oligomer. This may be formed in situ, or prior to melt kneading with ET, by functionalizing the PO in which case it is a self compatibilizer, or may be added as an ingredient, e.g., to the extruder together with ET and any un-functionalized PO, in which case it is an external compatibilizer.

In one embodiment, the functional group containing polymer or oligomer is a copolymer or terpolymer of (1) at least one unsaturated monomer and (2) at least one functional group containing unsaturated monomer, wherein the functional group containing unsaturated monomer contains at least one unsaturated group and at least one functional group. Such a copolymer or terpolymer is an external compatibilizer. Some specific examples of the functional group containing polymer or oligomer include a maleic anhydride grafted polyethylene, a maleic anhydride grafted ethylene-acrylic or methacrylic ester copolymer or terpolymer, a maleic anhydride grafted propylene homopolymer or copolymer, a maleic anhydride grafted ethylene-alpha olefin polymer, a maleic anhydride grafted ethylene-propylene rubber, a glycidyl methacrylate or acrylate (GMA) grafted polyethylene, a GMA grafted ethylene-acrylic or methacrylic ester co-polymer or terpolymer, a GMA grafted propylene homopolymer or copolymer, a GMA grafted ethylene-alpha olefin polymer, a GMA grafted ethylene-propylene rubber, an acrylic or methacrylic acid grafted ethylene copolymer or terpolymer, an acrylic and methacrylic acid ionomer, a styrene-maleic anhydride copolymer or terpolymer, a styrene-acrylic acid or styrene-methacrylic acid copolymer or terpolymer, a copolymer or terpolymer of ethylene-glycidyl methacrylate or ethylene-glycidyl acrylate, or any combination thereof.

In one embodiment, when present, the (d) unmodified polyolefin, ethylene copolymer or ethylene terpolymer may be independently selected from polyethylene, ethylene-vinyl acetate, polypropylene, ethylene-alpha olefin elastomer, ethylene-propylene elastomer, ethylene-propylene diene elastomer, ethylene-acrylate ester or methacrylate ester copolymer or terpolymer, or any copolymer or combinations thereof.

In one embodiment, the sensitivity to hydrolysis by acids or bases may not be solved just by compatibilizing. In one embodiment, diffusion of such harmful compounds into the polymer blend is reduced and hydrolysis resistance is increased by blocking hydrophilic end or side groups of molecules in the blend—especially in the ET phase. These are novel aspects of an embodiment of the present disclosure as disclosed in this present application.

The unmodified PO phase may be selected in a non-limiting manner from a group including, inter alia, polyethylene, ethylene-vinyl acetate, polypropylene homopolymer and copolymer, ethylene-alpha olefin elastomer, ethylene-propylene elastomer, ethylene-propylene diene elastomers, ethylene-acrylate ester or methacrylate ester copolymers and terpolymers, and combinations thereof.

Exemplary POs according to the present disclosure are selected in a non-limiting manner from polyethylene, for example commercially available products such as Attane™ and Dowlex™, manufactured by DOW, Petrothene™, manufactured by Equistar, Sabic™, manufactured by Sabic, Marlex™, manufactured by Chevron-Phillips, and Exceed™, manufactured by ExxonMobil; ethylene-alpha olefin elastomer, for example, commercially available products such as Engage™, manufactured by DOW, Exact™, manufactured by ExxonMobil and Tafmer™ and Evolue™, manufactured by Mitsui; or ethylene-propylene elastomer or ethylene-propylene diene elastomers, for example commercially available products such as Vistalon™, manufactured by Exxon Mobil and Nordel™, manufactured by DOW; ethylene-acrylate ester or methacrylate ester copolymers and terpolymers, for example commercially available products such as Elvaloy™, manufactured by Dupont and Lotry™, manufactured by Arkema; butyl rubber, nitrite rubber, silicone elastomer, polyurethane elastomer, styrene block copolymers; for example commercially available products such as Kraton™, manufactured by Kraton, etc.

Exemplary ET phases may be selected in a non-limiting manner from a group including, inter alia, polyamides, polyesters, polyurethanes, polyester block amide, or any combinations thereof. In one embodiment, the polyamides are aliphatic polyamides, selected in a non-limiting manner from a group including, inter alia, Polyamide 6, for example commercially available products such as Ultramid™, manufactured by BASF, Grilon™, manufactured by EMS-Grivory, and Akulon™, manufactured by DSM; Polyamide 66, for example commercially available products as Ultramid™, manufactured by BASF, Polynil™, manufactured by Nilit, Grilon™, manufactured by EMS-Grivory and Akulon™, manufactured by DSM; polyamide 6-66 copolymer, polyamide 6T, polyamide 6-12, polyamide 11 and Polyamide 12, for example commercially available products such as Rilsan™, manufactured by Arkema; Polyamide 46 for example commercially available products such as Stanyl™, manufactured by DSM; and Polyether block amide (PEBA), copolymers and blends thereof. One important source for cost-effective polyamide for the compatibilized blend according to the present disclosure is recycled polyamide fibers from the textile industry.

In one embodiment, the polyesters in the present disclosure are aromatic diacid-glycol based esters, such as polyethylene terephthalate (PET), polybutylene terephthalate (PBT), polyethylene napthalate (PEN), co-polyesters, copolymers and blends thereof. Commercially available products are Eastapak™ and Eastar™, manufactured by Eastman and Ultradur™ manufactured by BASF. Two important sources for cost-effective polyesters for the compatibilized blend according to the present disclosure are (i) recycled PET beverage bottles, usually as regrind; and (ii) recycled fibers from textile industry.

In one embodiment, the polyurethanes in the present disclosure are aliphatic and/or aromatic thermoplastic polyester-urethanes, polyether-urethane, copolymers and blends thereof. Aliphatic polyurethanes may be more preferred due to their better resistance against UV light and thermal induced degradation. Commercially available polyurethanes, suitable for the present disclosure are Pellethane™, manufactured by DOW, Estane™ and Tecothane™, manufactured by Noveon and Desmopan™, manufactured by Bayer.

The term 'compatibilized' refers hereinafter to a stable dispersion of one polymer in another polymer, wherein, due to limited compatibility in the solidified state, the two polymers are immiscible one in each other and tend to phase-separation during crystallization and solidification, in the absence of the compatibilization as described herein.

The term 'stable dispersion' refers to a dispersion, wherein the interface between a dispersed phase and a continuous phase includes a stabilizer molecule or macromolecule, that is different from the two aforesaid phases (PO and ET) and compatible with both. Either the ET or the PO may constitute the continuous phase, depending on the relative concentration in the composition. The dispersion is characterized by very limited phase-separation during crystallization and solidification. Typical morphology related to stable dispersion is very fine nodules or lamellas of one polymer in a continuous phase of a second polymer. Such nodules or lamellas usually having a diameter or size of less than about 30 microns, in one embodiment, a diameter or size less than about 10 microns, in another embodiment, a diameter or size less than about 5 microns, and in one embodiment, a diameter or size less than about 3 microns, and in one embodiment, less than about 1 micron. In one embodiment, the composition includes a continuous phase and a discontinuous phase dispersed in domains throughout said continuous phase, in which substantially all of said domains have a largest dimension of about 10 microns or less. In one embodiment, substantially all of such domains have a largest dimension of about 3 microns or less.

The stable dispersion retains its structure and properties during one or more of melting, extruding, molding, forming, welding and service, without phase separation or deterioration of physical and chemical properties. In one embodiment, stable dispersions are provided wherein at least one phase (dispersed phase or continuous phase) is covalently bonded to the compatibilizer.

In one embodiment, the functional group containing polymer or oligomer is selected in a non-limiting manner from (i) modified polymers and (ii) copolymers and terpolymers. Modified polymers with pendant functional groups and/or end functional groups may be selected in a non limiting manner from carboxyl, anhydride, oxirane, amino, ester, oxazoline, isocyanate and combinations of any tow or more thereof, for example, maleic anhydride grafted polyethylene, maleic anhydride grafted ethylene-acrylic ester co-polymers or terpolymers, maleic anhydride grafted propylene homopolymers and copolymers, maleic anhydride grafted ethylene-alpha olefin polymers, maleic anhydride grafted ethylene-propylene rubber, glycidyl methacrylate or acrylate (GMA) grafted polyethylene, GMA grafted ethylene-acrylic ester co-polymer or terpolymer, GMA grafted propylene homo-polymers and copolymers, GMA grafted ethylene-alpha olefin polymers, GMA grafted ethylene-propylene rubber, acrylic or methacrylic acid grafted ethylene copolymers and terpolymers, acrylic and methacrylic acid ionomer and combinations thereof.

Examples of commercially available functionalized polymers, adapted to compatibilize the blend as external compatibilizer according to the present disclosure are Lotader™, manufactured by Arkema, Bondyram™, manufactured by Polyram, Polybond™, manufactured by Crompton, Integrate™, manufactured by Equistar, Yparex™, manufactured by DSM, Primacor™ and Amplify™, manufactured by DOW, Epolene™, manufactured by Eastman, Escor™, Optema™ and Exxelor™, manufactured by ExxonMobil, Fusabond™, Bynel™, Elvaloy™ and Surlyn™, manufactured by Dupont, A-C™ modified polyolefins, manufactured by Honeywell, Modic-AP™, manufactured by Mitsubishi, Admer™, manufactured by Mitsui, Modiper™, manufactured by NOF, and Igetabond™, manufactured by Sumitomo.

In one embodiment, the functional or reactive group containing copolymers and terpolymers that are used as external compatibilizer are copolymers and terpolymers of at least one unsaturated monomer and at least one functional unsaturated monomer, wherein the functional unsaturated monomer includes at least one unsaturated group and at least one functional group are selected in a non-limiting manner from carboxyl, anhydride, oxirane, amino, ester, oxazoline, isocyanate and combination thereof. For example, the copolymer may be styrene maleic anhydride copolymers and terpolymers, such as SMA™ resins, manufactured by Sartomer, UMG AXS™, manufactured by UMG, Synthacryl™, manufactured by UCB resins and others.

According to one embodiment, the compatibilizer provides better compatibility between the PO and ET phases, by interacting with both phases in their interface, lowering the enthalpy of mixing, encapsulating dispersed phase and blocking polar groups in the ET phase.

According to one embodiment of the present disclosure, a compatibilized blend as defined in any of the above is provided by melt kneading of the ET and PO phases and a compatibilizer selected either from one or more external compatibilizer, self compatibilizer or a mixture thereof.

According to yet another embodiment, the functional group is reactive with at least one end-group or side-group of an engineering thermoplastic at its molten state. Specifically, yet not exclusively, end-group and/or side-group of the ET are selected in a non-limiting manner from one or more amino, hydroxyl or carboxyl groups or a combination thereof.

In one embodiment, the reaction takes place between anhydride or oxirane group of the compatibilizer with amino, amido, hydroxyl or carboxyl end groups or side groups of the engineering thermoplastic.

In another embodiment an external compatibilizer between the PO phase and the ET phase is provided by modifying at least one polymer by at least one functional group by means of solution polymerization in a reactor or by melt kneading in a reactive extruder.

The term reactive extruder refers to an extruder wherein a polymer or oligomer is functionalized by reactive groups by means of a reaction between a reactive group containing compound and the molten polymer, in which at least a portion of the reaction takes place in the extruder. In one embodiment, this reaction grafts the functional group to the polymer or oligomer main chain or backbone.

According to yet another embodiment, the compatibilizer between the PO phase and the ET phase is provided by modifying at least a portion of a PO phase by at least one functional group, by means of solution polymerization in a reactor, or by melt kneading in an extruder said PO, unsaturated monomer comprising at least one reactive group and a free radical source.

According to yet another embodiment, an external compatibilizer is provided by modifying a polymer selected in a non-limiting manner from a group including inter alia polyethylene, ethylene-vinyl acetate, polypropylene, propylene copolymers and terpolymers, ethylene-alpha olefin elastomer, ethylene-propylene elastomer, ethylene-propylene diene elastomers, ethylene-acrylate ester or methacrylate ester copolymers and terpolymers, butyl rubber, nitrite rubber, silicone elastomer, polyurethane elastomer, or any combinations thereof.

According to yet another embodiment, the aforesaid polymer is modified by means of melt kneading of (1) a PO polymer; (2) at least one unsaturated monomer that includes at least one reactive group per molecule; and (3) optionally at least one free radical initiator; in an extruder, in one embodiment a multi screw extruder and in another embodiment a twin screw extruder.

In one embodiment, a polyolefin, ethylene copolymer, ethylene terpolymer or any combination thereof is provided, and is then melt kneaded with an unsaturated monomer including at least one reactive group per molecule, in which the reactive group includes, for example, a carboxyl, anhydride, oxirane, amino, amido, ester, oxazoline, isocyanate or a combinations thereof, in the presence of free radicals to form the at least one functional group containing polymer or oligomer (a). Thereafter, the thus-formed functional group containing polymer or oligomer is combined with the at least one engineering thermoplastic, and the combination is melt kneaded.

The melt kneading is optionally provided in a multi-screw extruder, especially a twin-screw extruder, at a temperature in the range from about 130° to about 300° C.

According to yet another embodiment, the aforesaid polymer is modified by means of melt kneading in an extruder, wherein the at least one unsaturated monomer includes at least one reactive group per molecule, and is selected in a non-limiting manner from a group including maleic anhydride, acrylic acid, methacrylic acid, glycidyl acrylate or methacrylate (GMA), or combinations thereof.

For example, modification by melt kneading of
(i) PO polymer selected, e.g., from commercially available products of Attane™ and Dowlex™, manufactured by DOW, Petrothene™, manufactured by Equistar, Sabic™, manufactured by Sabic, Marlex™, manufactured by Chevron-Phillips and Exceed™ manufactured by Exxon Mobil, ethylene-alpha olefin elastomer Engage™, manufactured by DOW, Exact™, manufactured by ExxonMobil and Tafmer™ and Evolue™, manufactured by Mitsui; ethylene-propylene elastomer or ethylene-propylene diene elastomers Vistalon™, manufactured by ExxonMobil and Nordel™, manufactured by DOW; ethylene-acrylate ester or methacrylate ester copolymers and terpolymers Elvaloy™, manufactured by Dupont and Lotryl™, manufactured by Arkema; butyl rubber, nitrite rubber, silicone elastomer, polyurethane elastomer, styrene block copolymers Kraton™, manufactured by Kraton; with (ii) unsaturated reactive group containing monomer selected, e.g., from maleic anhydride or acrylic acid or methacrylic acid or glycidyl methacrylate or glycidyl acrylate in the presence of free radical initiator and optionally vinyl monomer in an extruder, in one embodiment a multi screw extruder and in another embodiment, a twin screw extruder. As used herein, the term "multi screw extruder is defined to include any extruder having two or more screws.

According to yet another embodiment, the compatibilizer utilized for the compatibilized blend is selected, in a non-limiting manner, from a group including, inter alia, maleic anhydride grafted polyethylene, maleic anhydride grafted ethylene-acrylic ester co-polymers or terpolymers, maleic anhydride grafted propylene homo-polymers and copolymers, maleic anhydride grafted ethylene-alpha olefin polymers, maleic anhydride grafted ethylene-propylene rubber, glycidyl methacrylate or acrylate (GMA) grafted polyethylene, GMA grafted ethylene-acrylic ester co-polymer or terpolymer, GMA grafted propylene homo-polymers and copolymers, GMA grafted ethylene-alpha olefin polymers, GMA grafted ethylene-propylene rubber, acrylic or methacrylic acid grafted ethylene copolymers and terpolymers, acrylic and methacrylic acid ionomer and combinations thereof.

Examples of commercially available functionalized polymers, adapted to compatibilize the blend as an external compatibilizer according to the present disclosure are Lotader™, manufactured by Arkema, Bondyram™, manufactured by Polyram, Polybond™, manufactured by Crompton, Integrate™, manufactured by Equistar, Yparex™, manufactured by DSM, Primacor™ and Amplify™, manufactured by DOW, Epolene™, manufactured by Eastman, Escor™, Optema™ and Exxelor™, manufactured by ExxonMobil, Fusabond™, Bynel™, Elvaloy™ and Surlyn™, manufactured by Dupont, A-C™ modified polyolefins, manufactured by Honeywell, Modic-AP™, manufactured by Mitsubishi, Admer™, manufactured by Mitsui, Modiper™, manufactured by NOF, and Igetabond™, manufactured by Sumitomo etc.

According to yet another embodiment, the aforesaid external compatibilizer includes at least one copolymer or terpolymer of (1) at least one unsaturated monomer, and (2) at least one functional group containing unsaturated monomer. For example, the (1) unsaturated monomer may comprise ethylene, an alpha olefin, styrene, acrylic or methacrylic acid ester or amide, vinyl ether or a polyene, and the (2) functional group containing unsaturated monomer may comprise an acrylic acid, methacrylic acid, maleic anhydride or a GMA, or any other similar monomeric grouping of unsaturation and functional group.

According to yet another embodiment, the functional group of the at least one functional group containing unsaturated monomers may be selected in a non limiting manner from a group including carboxyl, anhydride, oxirane, amino, ester, oxazoline, and isocyanate or ant combination thereof.

According to yet another embodiment, the functional group containing polymer or oligomer is manufactured by a polymerization process carried in one of the group of gas phase, molten phase, solution, emulsion and dispersion.

According to yet another embodiment, the functional group containing polymer or oligomer is selected in a non-limiting manner from styrene maleic anhydride copolymers and terpolymers, such as commercially available SMA™, resins manufactured by Sartomer, UMG AXS™, manufactured by UMG, Synthacryl™, manufactured by UCB resins and others.

According to one embodiment of the present disclosure, the composition is provided wherein the continuous phase is rich with PO and the dispersed phase is rich with ET. The compatibilized polymeric composition is characterized by higher resistance to hydrolysis, relatively to polyamide 66 and PET. Geotechnical articles including the polymeric compositions of the present disclosure are provided with one or more of an improved hydrolytic resistance and/or tear strength relative to polyester or polyamide based products; improved stiffness, strength and creep resistance relative to HDPE; improved chemical resistance against hydrocarbons and fuels, improved coefficient of friction, improved weldability and lower CTE, relative to polyethylene, and especially relative to HDPE, and particularly when the composition is exposed to temperatures higher than about 40° C.

According to one embodiment of the present disclosure the composition is provided, wherein the continuous phase is rich with ET and the dispersed phase is rich with PO. In this embodiment, the compatibilized polymeric composition is characterized by a higher resistance to creep, higher stiffness, higher strength and higher tear resistance, stronger welds, improved coefficient of friction with GRM, lower CTE, lower diffusion rate of harmful compounds through the polymer article and of HALS and UV absorbers from the polymer article and improved resistance against swelling of oils and fuels, relatively to polyethylene; especially relatively to HDPE. In one embodiment, geotechnical articles, especially geomembranes, reinforcing strips and molded articles and CCSs including those compatibilized polymeric compositions are provided with an improved dimensional stability and creep resistance, especially at temperatures higher than about 40° C., especially relative to HDPE based products.

In one embodiment, the polymeric composition includes (a) from about 1 to about 94.5% by weight of the composition of at least one functional group containing polymer or oligomer comprising on average at least one functional group per molecule, said at least one functional group selected from carboxyl, anhydride, oxirane, amino, amido, ester, oxazoline, isocyanate or any combination thereof; (b) from about 5 to about 98.5% by weight of the composition of at least one engineering thermoplastic; (c) from about 0.5 to about 94% by weight of the composition of at least one filler; and (d) optionally, up to about 93.5% by weight of an unmodified polyolefin, ethylene copolymer or ethylene terpolymer.

In another embodiment, the polymeric composition includes (a) from about 1 to about 95% by weight of the composition of at least one functional group containing polymer or oligomer comprising on average at least one functional group per molecule, said at least one functional group selected from carboxyl, anhydride, oxirane, amino, amido, ester, oxazoline, isocyanate or any combination thereof; (b) from about 5 to about 99% by weight of the composition of at least one engineering thermoplastic; (c) optionally up to about 94% by weight of the composition of at least one filler; and (d) optionally, up to about 94% by weight of an unmodified polyolefin.

According to yet another embodiment, the polymeric composition is provided by melt kneading in an extruder, in one embodiment in a multi screw extruder, at about 130° to about 320° C. and includes (i) from 10 to 90 weight percent ET; (ii) about 10 to about 90 weight percent PO and/or functional group containing polymer or oligomer as a self compatibilizer; and (iii), 0 to about 30 weight percent external compatibilizer. The amounts in percent mentioned herein refer to percentage based on total composition weight, unless otherwise mentioned.

In one embodiment, the polymeric composition is provided by melt kneading in an extruder, and in one embodiment in a multi screw extruder, at a temperature in the range of about 130° to about 320° C., a mixture including (i) about 10 to about 90 weight percent polyethylene terephthalate (PET) or polyamide 6 or polyamide 66; (ii) 10 to 90 weight percent polyethylene, ethylene copolymer or ethylene terpolymer or ethylene-alpha olefin elastomer and optionally a self compatibilizer thereof; and (iii) 0 to about 30 weight percent maleic anhydride or GMA modified polyethylene or propylene or ethylene copolymer or ethylene terpolymer or ethylene-alpha olefin as an external compatibilizer.

According to yet another embodiment, the polymeric composition is provided by melt kneading in an extruder, in one embodiment in a multi screw extruder, at a temperature in the range of about 130° to about 320° C., a mixture including (i) 10 to 90 weight percent ET, and (ii) about 90 to about 10 weight percent PO, wherein at least about 1 weight percent, especially at least about 5 weight percent and particularly wherein at least about 20 weight percent of the PO is functionalized, so that the functionalized portion is a self compatibilizer.

According to yet another embodiment, the PO is functionalized by anhydride, carboxyl or oxirane groups, to form the self-compatibilizer.

According to yet another embodiment, the aforesaid composition is provided by melt kneading in an extruder, in one embodiment in a multi screw extruder, at a temperature in the range from about 130° to about 320° C., a mixture including (i) about 5 to about 90 weight percent of an ET; (ii) 0 to about 90 weight percent of PO, and (iii) about 0.5 to about 95 weight percent of functionalized PO, wherein the functionalized PO is functionalized in a first extruder prior to mixing with ET and PO in a second extruder, or alternatively in a first portion of same extruder being used for mixed ET and PO with the functionalized PO. According to yet another embodiment, the functionalization of PO is provided wherein at least a portion of the PO is melt kneaded with (i) at least one unsaturated monomer including at least one reactive group per molecule; (ii) free radical initiator; and, (iii) optionally a second unsaturated monomer, oil, wax and/or heat stabilizers, in an extruder. This functionalizing process is in one embodiment provided in a multi-screw extruder, especially a twin-screw extruder, at a temperature in the range of about 130° to about 320° C.

According to yet another embodiment, the PO is modified by melt kneading in an extruder at a temperature range of about 130° to about 280° C., residence time of about 10 to 180 seconds, in the presence of 0.001 to about 3 weight percent free radical initiator, 0.01 to about 5 weight percent maleic anhydride or 0.1 to about 20 percent GMA and optionally up to about 5 weight percent co-monomer, especially styrene, such that about 0.01 to about 4 weight percent maleic anhydride or about 0.01 to about 19 percent GMA is grafted on the PO.

According to yet another embodiment, the polymeric blend composition further includes a filler. The filler is selected in a non-limiting manner from a group including, inter alia, metal oxides, metal carbonates, metal sulfates, metal phosphates, metal silicates, metal borates, metal hydroxides, silica, silicates, aluminates, alumo-silicates, chalk, talc, kaolin, clay, dolomite, fibers and whiskers, metal, metal coated inorganic filler, wollastonite, kaolin, industrial ash, concrete powder and cement, or any mixtures thereof. In one embodiment, the filler includes one or more of calcium carbonate, talc, clay, kaolin, industrial ash and barium sulfate.

It is noted in this respect that introduction of a filler to the blend increases creep resistance, scratch resistance, resistance to swelling of oils and fuels, opacity, improved heat conductivity and thus resistance to UV light and thermal induced degradation, improved manufacturability, lower CTE and improved weldability. The improved heat conductivity prevents heat buildup in the compatibilized polymeric composition when exposed to sunlight and heat because the CCS surfaces are less heated by the sunlight, so that UV and thermally induced degradation is slower relative to an unfilled system.

In one embodiment, the polymer composition of the present disclosure includes from about 0.5 wt % to about 70 wt % of the filler. In one embodiment, the polymer composition of the present disclosure includes from about 5 wt % to about 50 wt % of the filler. In one embodiment, the polymer composition of the present disclosure includes from about 10 wt % to about 40 wt % of the filler.

In one embodiment, when the filler includes one or more of calcium carbonate, talc, dolomite, silica, clay, wollastonite, kaolin, industrial ash and barium sulfate, the CTE of an article formed of the compatibilized blend of the present disclosure is lower than about 125 ppm/° C. In one embodiment, when the filler includes one or more of calcium carbonate, talc, dolomite, silica, clay, wollastonite, kaolin, industrial ash and barium sulfate, the CTE of an article formed of the compatibilized blend of the present disclosure is lower than about 100 ppm/° C. In another embodiment, when the filler includes one or more of calcium carbonate, talc, dolomite, silica, clay, wollastonite, kaolin, industrial ash and barium sulfate, the CTE of an article formed of the compatibilized blend of the present disclosure is lower than about 90 ppm/° C. In another embodiment, when the filler includes one or more of calcium carbonate, talc, dolomite, silica, clay, wollastonite, kaolin, industrial ash and barium sulfate, the CTE of an article formed of the compatibilized blend of the present disclosure is lower than about 80 ppm/° C. As a result of the improved CTE, i.e., CTE reduced relative to materials such as HDPE, articles made according to the present disclosure are more dimensionally stable than articles formed of such prior art materials as HDPE.

In addition to the foregoing benefits of filler, introduction of filler to the compatibilized polymeric composition results in a lower torque in the extruder and reduced power consumption, so that the production rate may increase and degradation of the components of the mixture is reduced. The effect of lowering extruder torque is most significant when the filler is surface treated so that improved compatibility with PO and/or ET is obtained.

According to yet another embodiment, surface treated filler, especially sub-micron fillers and particularly nano-size fillers, are admixed and stabilize the dispersed compatibilized blend of ET and PO. Admixture of the surface treated filler with the aforesaid compatibilizer provides a synergistic compatibilization. The synergistic compatibilization is provided when dispersed phase domains (usually in the form of nodules) are spaced one from each other by mineral particles, so coalescence between adjacent domains is retarded. The combination of the filler and the compatibilizer is synergistic since the compatibilizer enables the formation of a stable dispersion during melt kneading, and the filler, and especially a nano-size filler, results in a lower tendency to coalescence during cooling and crystallization.

In one embodiment, the composition further includes nano-size particles characterized by barrier properties, and permeability of said composition to molecules having a molecular weight lower than about 1000 Daltons is at least 10 percent lower as compared with a composition comprising a same composition but without said nano-size particles. In one embodiment, the nano-size particles are selected from nano-clay, nano-silica, nano-silicates, nano-alumosilicates, nano-zinc oxide, nano-titanium oxides, nano-zirconium oxides, nano-talc, nano-tubes, nano-metal particles and/or flakes, carbon black, nano size sulfides and sulfates and nano-size plant or animal originated cellulose, lignin or proteins and combinations of any two or more thereof.

In one embodiment, the composition further includes an additive selected from a heat stabilizer, a hindered amine light stabilizer (HALS), an organic UV absorber, an inorganic UV absorber, a hydrolysis inhibitor or a combination of any two or more of such additives.

Thus, the polymeric composition as defined in any of the above may include an effective amount of a hydrolysis inhibiting additive, referred to hereinafter by the acronym "HIA", that suppress hydrolysis of the engineering thermoplastic in the compatibilized blend during service, especially when polyester is the engineering thermoplastic and the medium around the CCS is characterized by a $pH \geq 7$, especially a $pH > 9$. HIAs may be selected in a non-limiting manner from a group including carbodiimide, especially poly-carbodiimides, such as commercially available products, e.g., Stabaxol™, manufactured by Rhein Chemie, blocked isocyanates, epoxy resins, phenolic resins, novolac resins, melamine resins, urea resins, glycoluril resins, tri-isocyanuric acid and derivatives thereof, styrene-maleic anhydride resins, aromatic and cycloaliphatic diacids and anhydrides thereof.

In one embodiment, the hydrolysis inhibitor is reactive with end or side groups of said at least one engineering thermoplastic and is one or more selected from a carbodiimide, a poly-carbodiimide, a blocked isocyanate, an epoxy resin, a phenolic resin, a novolac resin, a melamine resin, a urea resin, a glycoluril resin, tri-isocyanuric acid and derivatives thereof, a styrene-maleic anhydride resin, or an aromatic or cycloaliphatic diacid or an anhydride thereof.

According to yet another embodiment, a process for providing the composition and a strip thereof is disclosed, by means of melt kneading to provide the compatibilized blend and molding or extrusion to form the geotechnical article. The method includes steps selected inter alia for the following: (i) providing the functionalized polymer, ET, and optionally PO to an extruder, in one embodiment, a multi screw extruder and in another embodiment, a twin-screw extruder, wherein the polymers are in a form selected in a non-limiting manner from a group including, inter alia, pellets, granules, flakes, powder, chips, fibers, irregular aggregate and combinations thereof; optionally, wherein optionally a masterbatch of filler in a polymer and a masterbatch of additive in second polymer are provided from the main hopper; (ii) melting the polymers by means of shear and heat, in the first sector of the extruder; (iii) optionally melt kneading the molten mixture; (iv) optionally admixing the filler, e.g., wherein the filler is provided as powder or aggregate by means of a feeder, in one embodiment, a side feeder, through an opening in the extruder barrel; the filler wetted by the molten polymer blend and mixed into the melt; optionally removing entrapped air and humidity by at least one gate, opening or vent in the barrel of the extruder, e.g., wherein the vent is positioned upstream or downstream to the side feeder port; (v) melt kneading the mixture so that the average dispersed polymeric phase diameter is lower than about 30 microns, especially lower than about 10 microns and particularly lower than about 5 microns; optionally, filler is deagglomerated and dispersed, optionally, a second vent is located in the extruder barrel prior to the die, to remove further gaseous ingredients from the blend; (vi) pumping the compound through a die; the pumping is provided, e.g., by means of extruder screws or optionally by an additional gear pump; and (vii) extruding the compound to form a strip, sheet, profile, pellets, beads, granules, chips, flakes, three dimensional article or powder.

In one embodiment, the present disclosure provides a process for forming a geotechnical article including at least one layer, the at least one layer having one or more of the desirable properties described herein, formed of a composition as described herein, in which the process includes (i) providing (a) at least one functional group containing polymer or oligomer and (b) at least one engineering thermoplastic; (ii) melt kneading the combined (a) and (b); (iii) optionally, adding (c) at least one filler and further melt kneading said combined (a), (b) and (c); (iv) optionally adding (d) at least one unmodified polyolefin, ethylene copolymer or ethylene terpolymer to any of the (a), (b) or (c) or combination thereof; and (v) extruding the resulting composition into a strip, a profile, a film or sheet, a powder, or a plurality of beads, a three dimensional article, flakes, granules or pellets.

In another embodiment, the present disclosure provides a process for forming a geotechnical article including at least one layer, the at least one layer having one or more of the desirable properties described herein, formed of a composition as described herein, in which the process includes (i) providing an unmodified polyolefin, ethylene copolymer, ethylene terpolymer or any combination thereof; (ii) melt kneading the unmodified polyolefin, ethylene copolymer, ethylene terpolymer or any combination thereof with an unsaturated monomer including at least one reactive group per molecule, in which the reactive group may be a carboxyl, anhydride, oxirane, amino, amido, ester, oxazoline, isocyanate or a combinations thereof, in the presence of free radicals to form a functional group containing polymer or oligomer characterized by an average of at least one functional group per chain ; (iii) combining the thus produced (a) functional group containing polymer or oligomer with (b) at least one engineering thermoplastic; (iv) melt kneading the combined (a) and (b); (v) optionally, adding (c) at least one filler and further melt kneading the combined (a), (b) and (c); (vi) optionally adding (d) at least one unmodified polyolefin, ethylene copolymer or ethylene terpolymer to any of (a), (b) or (c) or combination thereof; and (vii) extruding said composition into a strip, a film or sheet, a powder, a profile, or a plurality of beads, flakes, granules, a three dimensional article or pellets.

In one embodiment, the polymeric composition, in accordance with the present disclosure, is remelted for forming into a desired product. In one such embodiment, the polymeric composition has been formed into pellets, powder, granules or flakes or other similar bulk form during its initial production. Such bulk forms are more easily transported, as is well known. Thus, in one embodiment, the compatibilized polymeric composition of the present disclosure, in the respective bulk form is remelted and is then formed into the shape of the desired product, such as a geotechnical article such as, for example, a sheet, a strip, a profile or a film for use in a CCS or another article having a 3D shape.

According to yet another embodiment, when present, the filler is admixed or compounded into the composition by a multi-screw extruder, especially a twin-screw extruder, at a temperature in the range of about 130° to about 320° C.

The processes described above include optional use of a filler. In one embodiment, the processes use any of the fillers described herein, added as described.

According to yet another embodiment, the filler is melt kneaded with the ET and the PO, and a compatibilizer (either self or external) to form a filled compatibilized polymeric composition.

According to yet another embodiment, the filler is first dispersed in a first polymer, forming a blend referred to hereinafter as a 'masterbatch'. The masterbatch is then further admixed with ET, PO, functionalized PO or other compatibilizer to form a filled compatibilized polymeric composition.

According to yet another embodiment, the compatibilized filled blend includes up to about 80 weight percent of filler characterized by an average particle size lower than 50 microns, especially lower than 25 microns, particularly lower than 10 microns. The filler is selected in a non-limiting manner from a group including inter alia metal oxides, metal carbonates, metal sulfates, metal phosphates, metal silicates, metal borates, metal hydroxides, silica, silicates, aluminates, alumo-silicates, chalk, talc, dolomite, kaolin, clay, fibers and whiskers, metal, metal coated inorganic filler, wollastonite, industrial ash, concrete powder and cement, and any mixtures thereof.

In one embodiment, the filler is selected from a group including inter alia calcium carbonate, dolomite, talc, clay, kaolin, silica, wollastonite, barium sulfate, industrial ash, concrete powder and cement or combination of the same.

According to yet another embodiment, a dispersion of ET in PO, and vice versa, of PO in ET, by aid of compatibilizer, and a dispersion of filler within those blends are provided by a multi-screw extruder, especially an intermeshing multi-screw extruder; particularly in a co-rotating twin screw extruder.

It is noted in this respect that according to the present disclosure, introduction of fillers into the composition, provides to the compatibilized polymeric composition certain advantages, especially when the compositions are extruded into a strip, membrane or three dimensional profile. Compositions including higher filler loading, lowering powder consumption by the extruder during article extrusion and reducing heat buildup due to improved heat conductivity of the blend in the melt phase. Surprisingly, when the filler is introduced into the aforesaid compositions, less mechanical energy is required for melt kneading of a mass unit of compound relative to unfilled HDPE or MDPE, and thus the relative throughput increases and heat buildup in this compound along extruder decreases. Moreover, since fluidity of the ET, and especially polyamides and polyesters, is much higher than PO, the resistance of the composition to shear during compounding and extrusion is lower than with HDPE. As a result, fewer gels are created and less degradation of the composition occurs. This invention therefore enables production of thinner strips under the same torque of the extruder and thus with increased throughput rate, as measured by unit length per unit time. This advantage becomes especially important when high molecular weight relatively elastomeric polymers are provided as the PO phase, e.g., LLDPE, EPR, EPDM, SEBS, and ethylene copolymers and terpolymers when a composition comprising high viscosity PO polymer, usually of MFI of less than about 0.2 g/10 minutes under load of 2.16 Kg at 190° C., is melt kneaded together with a more fluid polymer, e.g., polyamide or polyester as the ET phase, the result is a composition that does not resist torque in the extruder, does not tend to gel and degrade in the extruder, and has good melt strength and fast crystallization rate.

In one embodiment, the fillers are surface treated filler—especially those having hydrophobic surface treatment.

According to yet another embodiment, dispersion of the filler and polymers is provided in a one step process, wherein the polymers (functionalized PO, ET and optionally un-functionalized PO) are fed to first hopper of an extruder, melt kneaded, and the filler is fed from a second opening in the extruder to the melt. The second opening is usually a side-opening equipped with a side feeder for at least one filler. Entrapped air and adsorbed humidity are removed by means of at least one atmospheric vent. The mixture is further melt kneaded until any agglomerates are deagglomerated and the filler is dispersed evenly in the polymer. Entrapped volatiles as well as byproducts may be optionally removed by an optional vacuum vent. The resulting composition is then extruded through a die to form pellets, powder, granules, a three dimensional article or a profile or strip formed of or including the compatibilized polymeric composition.

According to yet another embodiment, the filler is surface treated by an agent selected in a non-limiting manner from organic acid, organic ester, oil, polymer, organic amide, organo-metallic including organo-silane, organo-titanate and organo-zirconate or a combination of the same. Surface treated fillers are dispersed more easily and require less mechanical energy. In one embodiment, the fillers are surface treated to have hydrophobic surfaces and in another embodiment are surface treated by a combination of an organo-metallic agent with a hydrophobic agent.

According to yet another embodiment, pellets or granules or flakes or powder of the compatibilized blend, including filled blends, are subsequently introduced to a second extruder for re-melting and extruding into a strip or profile or sheet, or to a blow molding machine to form a blown article or film or sheet, or to an injection molding machine to form a molded part or to a compression molding machine to form a molded part.

According to yet another embodiment, the first extruder for melt kneading the ET, PO, compatibilizer and, optionally, the filler and/or other additives, is a multi-screw extruder, an in particular, a twin-screw extruder, and the second extruder for extruding sheet or profile or strip is a single-screw extruder or a twin screw extruder.

According to yet another embodiment, the dispersion is provided in a two-step process, wherein part or all of the polymers are fed to a first hopper of the extruder, melt kneaded, and the filler is fed from a second opening in the extruder to the melt. The second opening is usually a side opening equipped with a side-feeder for the at least one filler. Entrapped air and adsorbed humidity are optionally removed by means of at least one vapor vent. The mixture is further melt kneaded until most agglomerates are deagglomerated and the filler is dispersed evenly in the polymer. Entrapped volatiles, as well as byproducts, are optionally removed by an optional vacuum vent. The blend is then pumped through a die to form pellets or beads or flakes or powder that are later provided to a second extruder to be mixed with the remaining polymer. The blend is referred to hereinafter by the term 'concentrate'. The concentrate of part of the polymers and filler can also be pumped as a melt directly to a second extruder, without cooling and pelletizing.

The introduction of fillers into the compatibilized polymeric composition according to the present disclosure has another advantage, especially when the compositions are extruded to a sheet, profile, film, or strip, and the strip is welded to another strip of the same composition, e.g., by means of an ultrasonic welding. This advantage is that the introduction of filler into the composition at a certain weight percentage improves its weldability, and this aspect will be discussed more detailed later in this disclosure. Moreover, the filler improves UV and heat stability of the blend and the geosynthetic article formed thereof. The filler may further provide coloring to the blend, e.g., in light and/or vivid colors, and especially in colors matching the confined GRM.

In one embodiment, the geosynthetic article includes an extruded or molded strip having a thickness in the range from about 0.1 mm to about 5 mm. In one embodiment, the strip, having a given size, has at least 10% greater pullout force at normal stress of 4 lb/in$^2$ (about 27.58 kPa), between the strip and sand, relative to a strip of the given size formed of virgin MDPE or HDPE, as tested by ASTM D6706-01.

In one embodiment, the geosynthetic article includes friction-promoting features on at least one outer surface of said article, wherein said friction-promoting features comprise texture, embossment, debossment, through-hole, finger-like extension, hair-like extension, wave-like extension, co-extruded line, bonded fibers or grains or aggregate, dots, matte or any combination thereof.

According to yet another embodiment, a strip is provided, and includes at least one layer, in one embodiment two or more layers, wherein at least one layer includes a compatibilized polymeric composition or filled compatibilized polymeric composition as defined in any of the above. The other layer or layers may be selected in a non-limiting manner from any composition as defined, inter alia, in any of the above or any other polymeric composition.

According to yet another embodiment, a heterogeneous multilayered strip is provided, wherein the one or more layers, other than the at least one layer including the compatibilized polymeric composition of the present disclosure, includes any other polymeric compositions or blends. According to yet another embodiment, a homogeneous multilayered strip is provided wherein all layers include compatibilized blends, which may be the same as or different from each other.

According to yet another embodiment, a strip including at least one layer, especially at least two layers, is provided, in which at least one layer includes nano-size particles, characterized by high barrier property against diffusion of small atoms and molecules including protons, hydroxyl ions, halides and ions thereof, free radicals, anions, cations, hydrocarbons, fuels, bases, aromatic ring containing compounds, heterocyclic ring containing compounds, low boiling point organic solvents and VOC, heavy metals, oxygen, ozone, and acids, so as the strip is more resistant against swelling, hydrolysis, oxidative degradation and extraction, evaporation or leaching of important additives, relative to HDPE based strip having the same dimensions, and is less permeable to diffusion through of the compounds. Such small molecules, in one embodiment, have molecular weight less than about 1000 Daltons. In one embodiment, the composition further includes nano-size particles which provide barrier properties to the composition. In one embodiment, permeability of the composition to molecules having a molecular weight lower than about 1000 Daltons is at least 10 percent lower as compared with a composition comprising a same composition but without the nano-size particles.

The nano-size barrier particles are selected in a non-limiting manner from a group including inter alia nano-clay and modifications thereof, nano-silica and modifications thereof, nano-silicates and modifications thereof, nano-alumosilicates and modifications thereof, nano-zinc oxide and modifications thereof, nano-TiO$_2$ and modifications thereof, nano-zirconium oxides and modifications thereof, nano-talc and modifications thereof, nano-tubes and modifications thereof, nano-metal particles and/or flakes and modifications thereof, metal coated inorganic particles and modifications thereof, carbon black nano size sulfides and sulfates and modifications thereof and nano-size natural particles and modifications thereof, especially yet not exclusively plant or animal originated matrices, such as cellulose, lignin, proteins or any combination of any of the foregoing particles.

In one embodiment the barrier nano size filler is selected from nano clay and modified nano clay.

In one embodiment, the filler is selected from a group including metals and metal coated inorganic particles, and the layer is characterized by improved electrical conductivity. The conductivity is useful for applications wherein electrical charge, current or potential is generated or need to be transferred along the article or via the article.

According to yet another embodiment, nano-size clay is introduced to at least one layer at loading of about 0.1 to about 70 percent of the compatibilized blend weight. Suitable grades of nano-size clay are supplied, e.g., by commercially available from Nanocor and Southern Clay Products.

In one embodiment, when the at least one layer further includes an additive selected from a HALS, an organic UV absorber and/or an inorganic UV absorber or any combination thereof, the layer provides at least 10% lower extraction, evaporation and/or hydrolysis rate of the additive relative to a layer of HDPE comprising the same additive and having the same dimensions.

In one embodiment, the at least one layer exhibits at least a 10% lower weight increase after immersion for 60 days at 25° C. in n-octane relative to a layer of HDPE having the same dimensions. The lower intake of the said hydrocarbon is due to the polarity of the ET, the barrier properties provided by the filler, optionally, the nano size filler, and due to the cross-linking effect provided by the reaction between functional groups of the functionalized PO and the ET.

In one embodiment, the at least one layer exhibits at least 10% better retention of elongation to break after immersion for 60 days at 45° C. in aqueous solution having pH=11 relative to a layer of PET having the same dimensions.

In one embodiment, the at least one layer exhibits at least 10% better retention of elongation to break (ETB) after immersion for 60 days at 45° C. in aqueous solution having pH=4 relative to a layer of PA6 having the same dimensions. Retention means final ETB divided by initial ETB.

The compatibilized blend defined above may further include additives selected from (i) organic UV absorbers and especially benzotriazoles and benzophenones, for example, commercially available Tinuvin™, manufactured by Ciba, and Cyasorb™, manufactured by Cytec; (ii) inorganic UV absorbers and especially titanium oxides and zinc oxides, including micro-size, sub-micron size and nano-size particles of the additives, for example commercially available SACHTLEBEN Hombitec RM 130F TN™, by Sachtleben, ZANO™ zinc oxide by Umicore, NanoZ™ zinc oxide by Advanced Nanotechnology Limited and AdNano™ Zinc Oxide™ by Degussa; (iii) carbon black; (iv) light stabilizers and especially hindered amine light stabilizers (HALS), for example commercially available Chimassorb™ manufactured by Ciba, Cyasorb™, manufactured by Cytec; or any mixture thereof.

The UV and heat stabilized compatibilized blend according to one embodiment of the present disclosure, is more resistant against UV light and thermal induced degradation relative to HDPE including the same dosage of the same additives. The mechanism behind this feature is the slower leaching and/or evaporation rate, relative to HDPE, of the UV absorbers and light stabilizers from the polymeric article by humidity and heat, the slower diffusion of free radical due to increased barrier properties and the lower heat buildup in the layer due to improved heat conductivity. The leaching rate is slower due to the inherent barrier properties of engineering thermoplastic, especially polyamides and polyesters, and the improved barrier properties provided by the nano-size barrier fillers. The presence of filler according to the present disclosure, described above, has a positive effect on slowing down the UV light and thermal induced degradation, due to improved heat conductivity and thus elimination of heat buildup in the strip and Arrhenius-type temperature dependent acceleration of degradation. The presence of inorganic UV absorbers improves the durability due to almost zero leaching and hydrolysis of the additive.

According to yet another embodiment, the strip includes two or more parallel layers, wherein at least one of the layers includes stabilizers to protect from the UV light and thermal induced degradation.

According to yet another embodiment, strips that include at least one layer, especially at least two layers, are provided, wherein at least one layer includes the compatibilized blend of the present disclosure. The obtained strip is useful, e.g., for geotechnical application, especially for CCSs.

According to yet another embodiment, strips as defined in any of the above are characterized by an improved coefficient of friction with GRM and especially with soils and peat, relative to strips made of virgin MDPE or HDPE, as tested in methods such as ASTM D5321-02 or other standard methods of testing coefficient of friction.

The sheet or strip or molded article as defined in any of the above embodiments may be provided by extrusion of the compatibilized blend directly from the same extruder used for mixing the ET and PO components, or from at least one second extruder or by molding of the blend.

According to yet another embodiment, the compatibilized blend is initially provided by a multi-screw extruder. The molten, pelletized or chopped compatibilized blend is fed to a second extruder, especially a single screw extruder, melt kneaded through a die to form a sheet or strip. The final thickness of such a strip may vary from about 0.1 millimeters (mm) to about 5 mm or more. In one embodiment the thickness of the strip is in the range from about 0.5 to about 2.5 mm.

According to yet another embodiment, an improved strip, especially adapted for CCSs, is provided. The friction of the strip with confined GRM is improved by introduction of one or more friction-promoting features on at least one outer surface of the strip. Those friction-promoting features are selected in a non-limiting manner from debossed textures, embossing, holes, finger-like extensions, hair-like extensions, wave-like extensions, fibrous-like polymeric lines provided from an extruder or by spraying, co-extruded lines, dots or mat and combinations thereof. In this manner, the GRM may be interlocked with those CCS friction-promoting features. In another embodiment improved friction is provided by introduction of filler having average particle diameter of greater than about 100 microns. In a specific embodiment the filler is an industrial ash, for example ash derived from combustion of coal. In another embodiment, the compatibilized blend is foamed, so as its surface is rough and/or porous, and its friction with GRM is improved.

According to yet another embodiment, the strip or molded article is pigmented by pigments and/or dyes to a color of the particular GRM being reinforced by the strip and CCS formed thereof. In one embodiment, the strip has the shade of soil; alternatively, it is pigmented to a color of grass; alternatively, it is pigmented to a color of peat; alternatively, its pigmented in any predetermined color.

According to still another embodiment, the ratio of the PO and ET components can be adjusted according to the expected use of the CCS. Thus, for example, when the CCS is to be used in desert-like conditions or in tropical regions, where the ambient temperature and sunlight and UV exposure in use is expected to be much higher than in temperate regions, the relative amount of ET can be increased relative to the PO. In one embodiment, the ratio for use in the hot areas is from 4 parts ET to 1 part PO to 1 part ET to 4 parts PO. Since increase in ET/PO ratio can provide enhanced strength at such temperatures, since the PO could become more easily stretched and weakened at higher temperatures. On the other hand, where the CCS is expected to be used in regions where the ambient temperature of use is expected to be lower than in temperate regions, e.g., sub-arctic, arctic, sub-antarctic or antarctic regions, then the relative amount of PO may be increased to provide better flexibility at such relatively low temperatures. In one embodiment, the ratio for use in the cold areas is from 1 part ET to 1 part PO to 1 part ET to 10 parts PO. Moreover—in those area wherein low temperature are expected during autumn and winter, PO phase further including a relatively elastomeric polymer having a glass transition temperature (Tg) lower than zero C. Thus, in one embodiment, the process of forming the compatibilized polymeric composition further includes selecting relative quantities of the at least one polyolefin, ethylene copolymer or terpolymer and the at least one engineering thermoplastic to provide creep resistance and flexural modulus appropriate to a latitude and/or environmental conditions expected in a region in which the geotechnical articles will be used. Similarly, in another embodiment, the relative quantities of additives may be adjusted according to the expected use. For example, where solar UV is high, additional UV absorbers and/or HALS may be included, In one embodiment, the PO phase includes ethylene acrylic acid or methacrylic acid or ester copolymers or terpolymers, characterized by higher resistance to UV light relative to HDPE and ET. Examples of such UV resistant polymers are the commercially available polymers ELVALOY™ manufactured by Du-Pont and LOTRYL™ manufactured by Arkema.

According to yet another embodiment, the strips are assembled into three dimensional CCS, which includes a plurality of strips, as defined in any of the above, in which one strip communicates with its neighboring strip in a side by side relationship via discrete physical joints, so that those joints are spaced one from another by nonjoined areas. See, e.g., FIG. 1, described in more detail below. In one embodiment, the joints are a result of welding, bonding, sewing or any combination thereof. According to yet another embodiment, distance between joints is varied from the range of about 50 mm to about 1500 mm, measured from the ends of adjacent joints. The term 'about' refers in the present disclosure to a range of ±20% of the defined measure.

According to yet another embodiment, the distance between joints is in the range of about 51 mm to 1500 mm or more, measured from the center of each joint. In one embodiment the joints are welded by an ultrasonic apparatus, especially by pressureless methods and means of joining the same. The weldability, especially by ultrasonic welding, according to yet another embodiment of the present disclosure, is a significantly improved factor in the process of CCS manufacturing. In one embodiment, a plurality of extruded strips, cut to a pre-defined width, are welded to form a very durable CCS for GRM confinement.

In one embodiment, the article comprises an extruded or molded strip having a thickness in the range from about 0.1 mm to about 5 mm. In one embodiment, the strip, having a given size, has at least 10% greater pullout force at normal stress of 4 lb/in$^2$ (about 27.58 kPa), between the strip and sand, relative to a strip of the given size formed of virgin MDPE or HDPE, as tested by ASTM D6706-01. In another embodiment, the geotechnical article includes friction-promoting features on at least one outer surface of the article, wherein the friction-promoting features include, for example, texture, embossment, debossment, through-hole, finger-like extension, hair-like extension, wave-like extension, co-extruded line, bonded fibers or grains or aggregate, dots, matte or any combination thereof.

In one embodiment, the geotechnical article is a three dimensional cellular confinement system (CCS) including a plurality of the strips, each of the strips communicating with its neighboring in a side by side relationship via discrete physical joints, in which the joints are spaced one from the other by non-joined areas. In one embodiment, the three dimensional CCS is adapted for containment and/or confinement and/or reinforcement of earthen material, soil, rock, gravel, sand, stone, peat, clay, concrete, aggregate, road building materials and any combination of two or more thereof.

In one embodiment, the joints are provided by welding, bonding, sewing, stapling, riveting or any by combination thereof. In one embodiment, the joints are welded by one or more of ultrasonic welding, laser welding and hot-press welding. In one embodiment, the composition of the present disclosure results in at least 10% shorter cycle time of welding relative to virgin HDPE for a same weld dimension. That is, when an article made of the composition described herein is welded, the time required to form an acceptable weld is reduced by at least 10%, in this embodiment.

In one embodiment, a geotechnical article formed of or including the compatibilized polymeric composition of the present disclosure provides weldability in which weld lines and weld spots (e.g., isolated welds not necessarily in a line) are able to withstand years of continuously applied loads at temperatures in excess of 40° C., in one embodiment, temperatures from about 40° C. up to about 70° C., and in another embodiment, temperatures from about 40° C. up to about 60° C. In one embodiment, a geotechnical article formed of or including the compatibilized polymeric composition of the present disclosure is able to withstand such temperatures for periods ranging from at least 2 years up to about 100 years. In one such embodiment, such geotechnical article is able to withstand such temperatures for such periods without disintegration or significant creep. By contrast to the present disclosure, geotechnical articles made of prior art materials such as HDPE or MDPE, are not able to withstand such temperatures for such periods of time, if at all. In one or more such embodiments, such geotechnical articles provide such performance far surpassing the performance of prior art materials such as HDPE or MDPE.

Polyethylene is known to be difficult to weld by ultrasonic welding, due to its low density, low modulus and low coefficient of friction. The novel combination of ET and PO provides improved weldability in comparison with HDPE. The improved weldability as disclosed in the present disclosure is a result of a combination of properties as defined above. The improved weldability is most significant in ultrasonic welding. Hence, during ultrasonic welding, high-frequency, e.g., ultrasonic mechanical vibrations are transmitted by an ultrasonic welding machine to the mating plastic parts. At the contact point, joint or interface of the two parts, a combination of applied force and surface and/or intermolecular friction from the ultrasonic vibrations increases the temperature until the melting point of the thermoplastic is reached. The ultrasonic energy is then removed and a molecular bond or weld results between the two plastic parts. High coefficient of friction and high acoustic conductivity is favored.

Ultrasonic welding is more efficient in relatively rigid materials and relatively amorphous ones.

An ultrasonic welding system typically contains a high-frequency power supply, usually 20-40 kHz. The high-frequency energy is directed into a horn, also known as a sonotrode, that transmits the mechanical vibrations into the target to be welded.

Surprisingly, when ET and PO are blended, including a compatibilizer, according to the method defined in the present disclosure, and especially when the compatibilized blend further includes filler, the weldability is significantly improved relative to unfilled HDPE-based strip and unfilled PO-ET blends, having similar dimensions. The improvement is in the speed wherein the surface is melted, the speed wherein the surface is recovering its strength, the final weld strength and its load bearing capabilities for prolonged periods at elevated temperatures.

A suggested mechanism is illustrated as follows in a non-limiting manner as a synergistic weldability: the more rigid ET-rich phase, characterized by high modulus of elasticity and low acoustic damping, i.e., creep modulus, loss modulus, and dissipation factor, responds fast to the ultrasonic vibrations and heats up the lower melting point PO-rich phase, so that the weld is formed faster than when HDPE alone is welded. The presence of filler in those polymeric phases, and especially in the ET-rich phase, increases its modulus of elasticity, coefficient of friction and the velocity of sound in the phase. During a subsequent cooling step, the ET-rich phase crystallizes faster than the PO-rich phase, so that a shorter cycle time is provided. During the cooling step, the filler serves as nucleating agent. The presence of filler, especially sub-micron particles and nano-size particles, improves the nucleation rate of both ET and PO phase, so that the resulting weld becomes strong and durable much faster relative to un-filled HDPE or MDPE or to an un-compatibilized PO-ET blend.

In one embodiment, when two strips are joined by welding, the ultimate weld strength, measured 48 hours after welding, at ambient temperature of two strips welded together according to the present application is greater than about 1300 N for a weld width of 100 mm.

In another embodiment, when two strips are joined by welding, the ultimate weld strength measured 48 hours after welding, at minus 20° C. of two strips welded together according to the present application is greater than about 1600 N for a weld width of 100 mm.

In one embodiment, when two strips are joined by welding, the ultimate weld strength measured 48 hours after welding, at ambient temperature of two strips welded together according to the present application is greater than about 2000 N for a weld width of 100 mm.

In another embodiment, when two strips are joined by welding, the ultimate weld strength measured 48 hours after welding, at minus 20° C. of two strips welded together according to the present application is greater than about 2400 N for a weld width of 100 mm.

In one embodiment, when two strips are joined by welding, the ultimate weld strength of two welded strips at minus 20° C. is greater than about 1000 N for a weld width of 100 mm.

In one embodiment, when two strips are joined by welding, the ultimate weld strength of two welded strips at plus 70° C. is greater than about 1000 N for a weld width of 100 mm.

As shown, for example, by the foregoing, in one embodiment, the improved weldability provided by the compatibilized polymer composition of the present disclosure is an important and integral part of the product integrity of articles formed in accordance with the present disclosure. In articles such as the CCS, the point at which parts are welded together is a weakness point and the formation of such welds, particularly formation of high quality welds, is a time consuming process. The novel compatibilized polymeric composition provides better heat conductivity, and sound conductivity, so that welding, especially ultrasonic welding, is faster and the resulting weld is more consistent, stronger and performs better and lasts longer under the type of continuous loading to which geotechnical articles, and especially CCS, are subjected. All of these improvements result from the compatibilized polymeric composition in accordance with the present disclosure.

In one embodiment, a portion of the geotechnical article includes a reinforcing structure adapted for use in attaching the article to a substrate, for use as CCS. That is, for example the CCS must be anchored to the ground or other substrate upon which it is being used. See FIGS. 1, 3 and 6, discussed below. In general, a stake or wedge, in the form, for example, of a short length of rebar, a spike, an angle-iron, or a polymeric material (including, in one embodiment, the compatibilized polymeric composition of the present disclosure), is used to anchor the CCS to the ground. The physical form of such stake or wedge is known in the art. Thus, in one embodiment of the present disclosure, a geotechnical article, such as a CCS, is formed with the compatibilized polymer composition and is employed in combination with wedges and tendons. In one embodiment, the tendons, and in another embodiment, the wedges, and in yet another embodiment, both the wedges and the tendons, are also formed from a compatibilized polymer blend according to the present disclosure. Thus, although wedges and tendons are known in the prior art, the present disclosure includes the combination of a geotechnical article, either formed of or including a compatibilized polymer composition as described herein, in combination with wedges and tendons. In another embodiment, the geotechnical article and either or both of the wedges and tendons are either formed of or include the compatibilized polymer composition of the present disclosure.

The point at which the stake contacts the CCS, in one embodiment, is reinforced. In one embodiment, the reinforcing structure includes a compatibilized polymeric composition having a ratio of the at least one polyolefin, ethylene copolymer or terpolymer with respect to the at least one engineering thermoplastic which is adjusted to provide at least one of enhanced strength, enhanced resistance to degradation resulting from contact with materials used for attaching to a substrate, enhanced resistance to UV, enhanced resistance to elevated temperatures, or enhanced resistance to thermal expansion. Thus, in one embodiment, an additional layer of the geotechnical article is provided at the general location at which a stake will be used to anchor the geotechnical article to the ground. See FIG. 6, discussed below. In one embodiment, the additional layer includes a different ratio of PO and ET, relative to that used for the remainder of the CCS, to provide enhanced strength and/or improved resistance to environmental effects. For example, increasing the relative amount of the ET will provide improved strength. As another example, stakes are often made of iron (e.g., the rebar mentioned above), and iron will absorb more heat in sunlight and/or high temperature conditions than will the geotechnical article. This heat will be transferred to the article and may weaken it at and near the contact point. Thus, the reinforcement can provide improved resistance to elevated temperatures reached by the stake, with which it is in contact. As will be understood, the degree of adjustment of the ratio of PO to ET is somewhat limited, because the desirable features resulting from the combination of components of the compatibilized polymeric composition remain important in the reinforced portions of the article.

Descriptions of Embodiments Illustrated in the Drawings

FIG. 1 is a perspective view of a single layer CCS including a plurality of welded strips, wedges and tendons, in accordance with an embodiment of the present disclosure. In FIG. 1, there is shown a CCS 10 reinforced by tendons 12. The CCS 10 includes a plurality of strips of plastic 14 which are bonded, sewn or welded together, and particularly, ultrasonically welded, one strip to the next at alternating and equally spaced bonding areas 16 to form cell walls 18 of individual cells 20. Pairs of the strips 14 are paired, starting, for example, with an outside strip 22 paired to an inside strip 24, a pair of the next two inside strips 24, and so on. Each such pair is bonded, e.g., at a bonding area 16, As shown at the left end of FIG. 1, which shows an end of the CCS, the bonding area 16 includes a weld 26 adjacent the end 28 of each strip 14. At the ends of CCS, a short tail 30 between the end 28 of strip 14 and the outside weld 26 is provided to stabilize segments of the strip 14 adjacent the outside weld 26. Each pair of strips is welded together at additional bonding areas 16, creating approximately equal length strip segments between the outside welds 26. In addition to these welds, each strip 14 (except the outermost strip) from each adjacent pair of strips 24 is also welded at an intermediate point 32 to adjacent strips at positions intermediate each of the welds in the pairs of strips. As a result, when the plurality of strips 14 are stretched in a direction perpendicular to the faces of the strips, the plastic strips bend in a sinusoidal manner and form a web of cells 20, referred to herein as a CCS, in a repeating cell pattern. Each cell 20 of the cell web has cell walls made from one strip and a cell wall made from a different strip.

AS noted herein, the compatibilized polymeric composition in accordance with the present disclosure provides, in one embodiment, enhanced weldability, which includes enhanced and/or improved weld strength of welds formed from the composition of the present disclosure, compared to welds formed of prior art materials, This enhanced and/or improved weld strength is important not only during the sometimes long years of use of articles made from the composition, but also during installation of the articles, such as geotechnical articles and CCS. Thus, the welds are subjected to high stress during one or more points, e.g., (1) compression of the article by the GRM it holds during installation; (2) expansion of the GRM during high humidity periods; (3) expansion of the GRM during freezing/thawing cycles of water contained in the GRM; and (4) thermal mismatch (arising, for example, from different CTE) between the GRM and structures of the article such as CCS walls.

In the embodiment illustrated in FIG. 1, adjacent the bonding areas 16 or 32, are apertures 34 in some of the strips 14. Each tendon 12 extends through a series of apertures 34 which are substantially coincident. The tendons 12 reinforce the cell web and improve the stability of web installations by acting as continuous, integral anchoring members which prevent unwanted displacement of the web. It is noted that, while the CCS shown in FIG. 1 includes tendons, tendons are not always needed or used in CCS. For example, where wedges (described below) are used, tendons may not be needed, and where the CCS is not subject to shifting, tendons may not be needed. Tendons may be used in channel and slope applications to provide additional stability against gravitational and hydrodynamic forces and may be required when an underlayer or naturally hard soil/rock prevents the use of stakes.

In FIG. 1, the CCS embodiment shown further includes wedges 36, which are used to attach the CCS to the substrate to which it is applied, e.g., to the ground. The wedge 36 is inserted into the substrate to a depth sufficient to provide an anchor to assist in holding the CCS in place. The wedges 36 may take the form of any wedge known in the art for use with CCS. In one embodiment, the wedge 36 is simply a section of iron or steel rebar, cut to an appropriate length. In another embodiment, the wedge 36 is formed of a polymeric material. In another embodiment, the wedge 36 is formed of any of the compatibilized polymeric compositions as disclosed in the present disclosure for use in the CCS itself. In one embodiment, the composition of the wedge 36 may be the same compatibilized polymeric composition as in the CCS with which the wedge is used, and in another embodiment, the composition of the wedge differs from that of the CCS with which it is used. In one embodiment, the wedge is formed of a composition having greater rigidity, obtained, for example, by a higher loading of the ET component. In one embodiment, the wedge is formed of a composition having greater rigidity, obtained, for example, by employing a different polymer or blend of polymers for the ET component of the composition.

Additional apertures 34 may also be included in the polymeric strips, as described in U.S. Pat. No. 6,296,924. These additional apertures increase frictional interlock with the GRM by up to 30%, increase root lock-up with vegetated systems as roots grow between the cells 20, improve lateral drainage through the strips to give better performance in saturated soils, and promote a healthy soil environment. Reduced installation and long-term maintenance costs may also occur. In addition, such CCSs are lighter and easier to handle compared to CCSs with solid walls.

Figure 2:
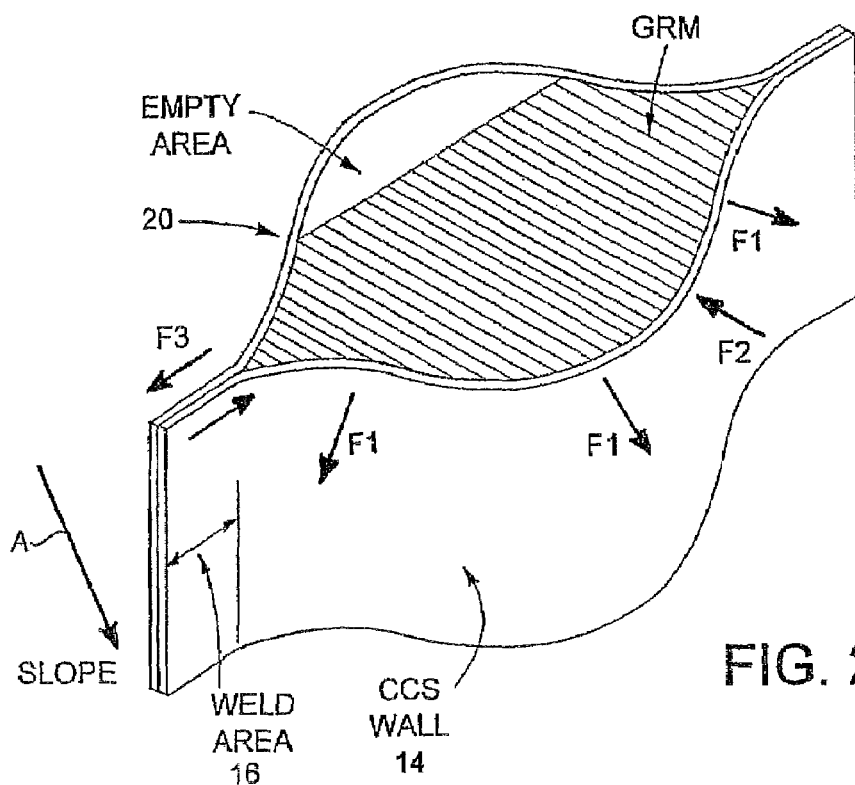
FIG. 2 is a perspective view of a single cell of a CCS containing a GRM.

FIG. 2 is a perspective view of a single cell 20 of a CCS formed of or including the compatibilized polymeric composition, containing a GRM, in accordance with an embodiment of the present disclosure. The CCS cell 20 shown in FIG. 2 is depicted as it might appear when the CCS is located on a slope (direction indicated by the arrow A), so that the GRM retained within the cell is disposed substantially horizontally, while the walls of the CCS are disposed perpendicularly to the slope on which the CCS is located. As a result, the CCS and the cell 20 thereof are tilted towards the viewer. Thus, the walls 14 of the CCS are not aligned vertically, but are approximately perpendicular to the surface of the substrate, and so the GRM fills the tilted CCS leaving an "empty area" on the up-slope side of the CCS, as shown in FIGS. 2 and 3.

The cell 20 depicted in FIG. 2 is subject to the forces F1 and F2 at the side walls 14 and to the force F3 at the weld. As a result of the above-described tilting and the empty area, the forces F1 and F2 applied to the walls of the CCS are not balanced. On the near side of the cell 20, the GRM fills the cell up to the upper edge, applying force F1 against the wall from the inside. The GRM in the cell 20, and the GRM in adjacent, downslope cells (not shown in FIG. 1) exerts a force F2 in an upslope direction. Due to the empty area the force F2 is less than the force F1. This unbalanced force may lead to failure—especially of prior art welds when the temperature of the CCS wall exceeds about 40° C., or when fuels and organic fluids are in contact with the CCS. Thus, there is a strong need for a polymeric composition, such as the compatibilized polymeric composition disclosed herein, that provides greater strength, better heat and chemical stability and improved weld reliability.

The force F3 shown in FIG. 2 results from the GRM, and tends to apply a separation force to the weld 16. The force from the GRM results both from its mass and, or example, from expansion of the GRM during repeated freeze-thaw cycles, and/or repeated heating-cooling cycles. Damage from these two physical forces may be further accelerated when hydrocarbons such as fuels and organic fluids come into contact with the CCS. During freezing of water contained in the GRM, the GRM expands, applying pressure against the walls 14 and the weld 16, then the GRM relaxes upon cooling to "fill" or relax into any expanded area resulting from the pressure, and then the GRM again expands during the next freeze cycle, and so forth. This demonstrates both the result of freeze-thaw cycling on the CCS and the pressures applied to the weld 16, and shows the importance of a strong weld between the adjacent strips forming the CCS.

Figure 3:
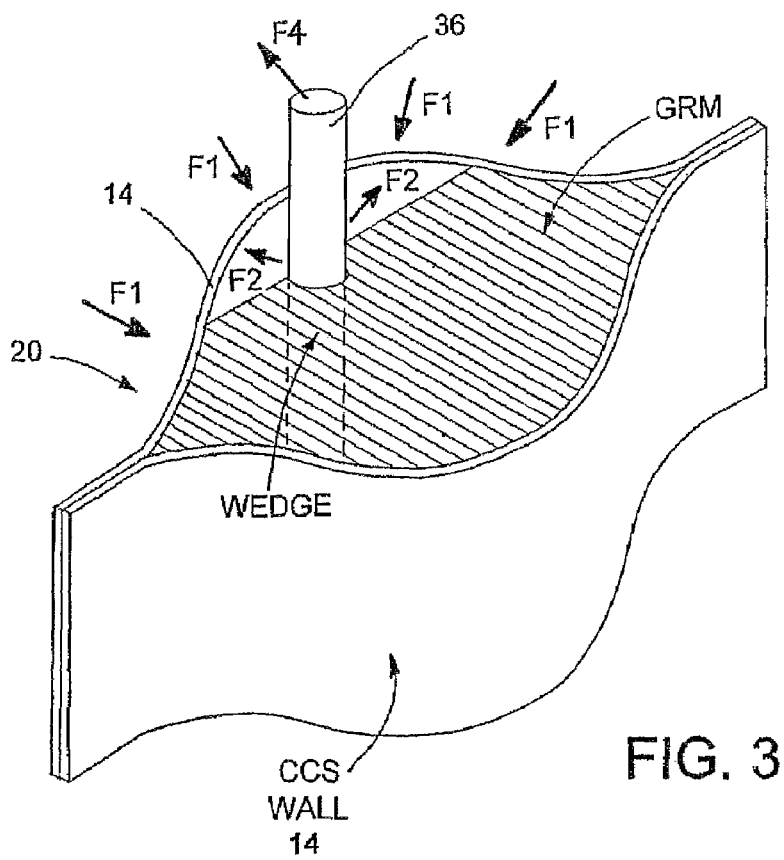
FIG. 3 is a perspective view of a single cell of a CCS containing a GRM and including a wedge.

FIG. 3 is a perspective view of a single cell 20 of a CCS formed of or including a compatibilized polymeric composition, containing a GRM as in FIG. 2, and also including a wedge 36, as described with respect to FIG. 1, in accordance with another embodiment of the present disclosure. FIG. 3 illustrates forces applied to the CCS and to the individual cell 20 containing the wedge 36. As suggested by FIG. 1, not every cell in a CCS includes a wedge 36. A sufficient number of wedges 36 are used to help retain the CCS in its original location on the substrate to which it is applied.

As shown in FIG. 3, the forces F1 and F2 (described above with respect to FIG. 2) remain present in FIG. 3, and apply substantially the same pressures to the cell 20 as described above. In the embodiment shown in FIG. 3, a wedge 36 has been added, and it applies a force designated F4 to add to the forces F2 in balancing the forces F1 and to maintain the CCS in position. As will be recognized, the presence of the wedge 36 applies the force F4 in a very localized part of the upper wall 14. The increased, localized pressure can have a detrimental effect on the wall, if it is not sufficiently strong and creep-resistant. If the CCS wall is chemically sensitive to oils and fuels—as is the case with HDPE or MDPE, for example, the wall becomes weak, more flexible and more likely to yield at such localized, specific stress concentration points. In one embodiment, described below with respect to FIG. 6, the upper wall is reinforced by addition of an auxiliary wall portion, in order to mitigate the possibly detrimental effects of the localized pressure from the wedge 36 on the upper wall 14.

Figure 4:
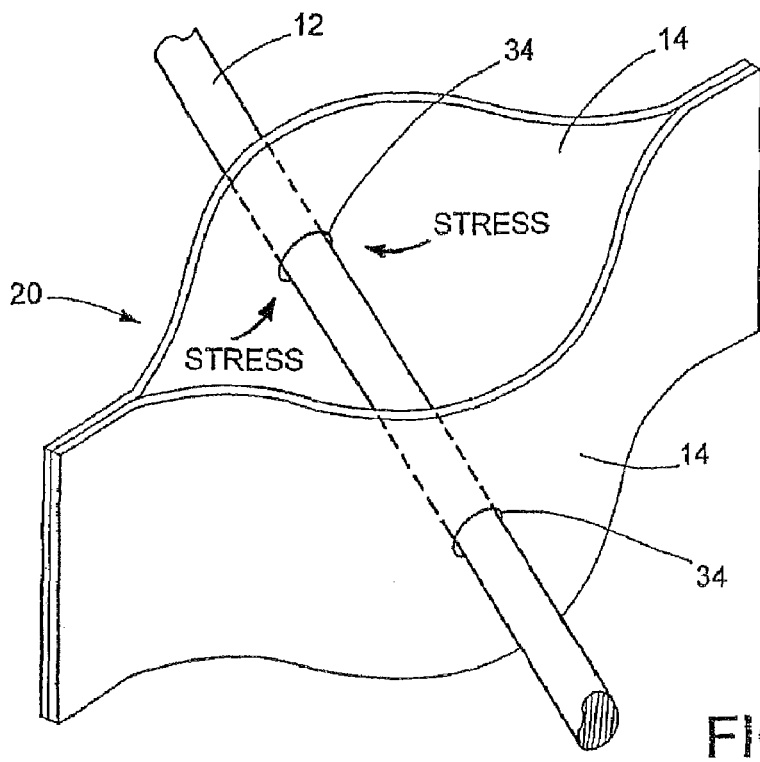
FIG. 4 is a perspective view of a single cell of a CCS including a tendon and lockers.

FIG. 4 is a perspective view of a single cell 20 of a CCS, formed of or including a compatibilized polymeric composition, including a tendon 12, in accordance with another embodiment of the present disclosure. As described with respect to FIG. 1, the tendon 12 passes through the walls 14 at the apertures 34. The tendon 34 is used to help maintain the CCS in its intended location, particularly in those applications wherein wedges are forbidden or cannot be used due to limitations imposed by the substrate. For example, tendons may be used in an application where the CCS is placed on a geomembrane, and it is desired to not penetrate the geomembrane with a wedge. As shown in FIG. 4, the tendon 34 applies stress to the wall 14 in the vicinity of the aperture 34. This stress can result in damage to the wall 14, possibly leading to failure of the CCS. In one embodiment, the tendon 12 is simply a section of rebar, cut to an appropriate length. In another embodiment, the tendon 12 is formed of a polymeric material. In another embodiment, the tendon 12 is formed of any of the compositions as disclosed in the present disclosure for use in the CCS itself. In one embodiment, the composition of the tendon 12 may be the same composition as in the CCS with which the tendon is used, and in another embodiment, the composition of the tendon differs from that of the CCS with which it is used. In one embodiment, the tendon 12 is formed of a composition having greater rigidity, obtained, for example, by a higher loading of the ET component. In one embodiment, the tendon 12 is formed of a composition having greater rigidity, obtained, for example, by employing a different polymer or blend of polymers for the ET component of the composition.

Figure 5:
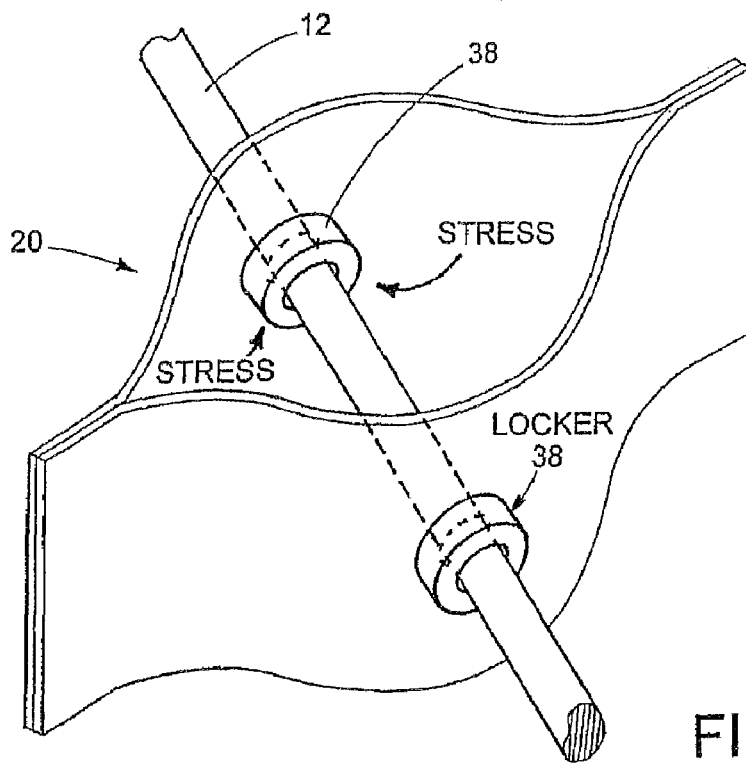
FIG. 5 is a perspective view of a single cell of a CCS including a tendon.

FIG. 5 is a perspective view of a single cell 20 of a CCS, formed of or comprising a compatibilized polymeric composition, including a tendon 14 and lockers 38, in accordance with an embodiment of the present disclosure. The lockers 38 are provided to spread out the force of the stress applied to the walls 14 by the tendon 16. The spreading results in application of a reduced pressure per area of the wall 14. The locker 38 may be formed of any appropriate material. The locker 38, in one embodiment, is formed of a composition as described herein, in accordance with the polymeric composition of the present disclosure. In one embodiment, the locker 38 includes a polymeric composition that is the same as that of the CCS with which it is used, and in another embodiment, the locker 38 includes a polymeric composition that is different from that of the CCS with which it is used. In one embodiment, when the polymeric composition of the locker is different, it contains a higher content of the ET component, and in another embodiment, it contains an ET component providing higher strength than that of the CCS with which it is used. The locker provides a means to transfer stress between the tendon and the wall of the CCS through which the tendon passes. By using the locker 38, the forces transferred from the tendons to the wall of the CCS can be spread out. While the wall of the CCS, being formed of or including the compatibilized polymeric composition of the present disclosure, is quite strong as described in detail herein, use of the locker 38 provides added protection against failure in the long term.

Figure 6:
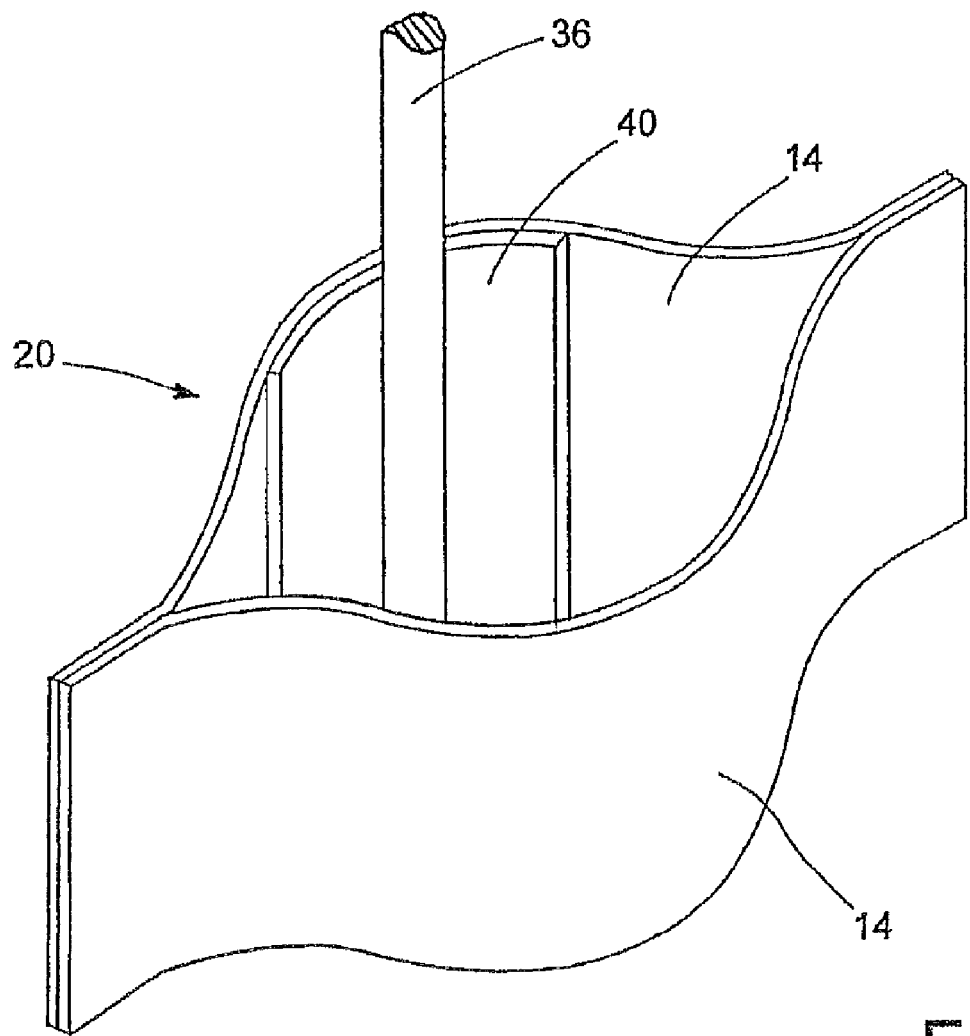
FIG. 6 is a perspective view of a single cell of a CCS including a wedge and a reinforced wall portion, in accordance with another embodiment of the present disclosure.

FIG. 6 is a perspective view of a single cell 20 of a CCS, formed of or including a compatibilized polymeric composition, including a wedge 36 and a reinforced wall portion 40, in accordance with another embodiment of the present disclosure. The reinforced wall portion 40, like the locker 38 does for the tendons 12, spreads out and disperses the pressure resulting from the force applied by the wedge 38 to the wall 14. The embodiment shown in FIG. 6 includes a reinforced wall portion 40 having a size significantly wider than the wedge 36. In other embodiments, the reinforcing wall portion 40 may be a different size, either smaller or larger than that illustrated, as determined by the person of ordinary skill employing the CCS. In one embodiment, the reinforced wall portion 40 extends the full width of the strip from which the wall 14 to which it is attached is formed, and in another embodiment, the reinforcing wall portion 40 may extend less than or greater than the full width of the wall 14. In one embodiment, the reinforced wall portion 40 extends beyond the upper edge of the wall 14 and is folded down over the far side of the wall 14, further to increase the strength of the overall wedge-contacting portion of the wall of the CCS.

In one embodiment, the reinforced wall portion 40 is attached to the wall 14 with an appropriate adhesive, e.g., a pressure-sensitive adhesive or a curable adhesive. In one embodiment, the reinforced wall portion 40 may be attached to the wall 14 by a welding operation, particularly ultrasonic welding, or sewing, performed onsite. In another embodiment, the reinforced wall portion can be applied to the wall 14 at the same time when the welds 16 and 26 are formed.

The reinforced wall portion 40 may be formed of any suitable polymeric material. In one embodiment, the reinforced wall portion 40 is formed of any of the compositions as disclosed in the present disclosure for use in the CCS itself. In one embodiment, the composition of the reinforced wall portion 40 may be the same composition as in the CCS with which the reinforced wall portion 40 is used, and in another embodiment, the composition of the reinforced wall portion 40 differs from that of the CCS with which it is used. In one embodiment, the reinforced wall portion 40 is formed of a composition having greater rigidity, obtained, for example, by a higher loading of the ET component. In one embodiment, the reinforced wall portion 40 is formed of a composition having greater rigidity, obtained, for example, by employing a different polymer or blend of polymers for the ET component of the composition.

In one embodiment, the reinforced wall portion 40 may be used instead of the locker 38. That is, reinforced wall portion 40 may include an aperture 34, through which a tendon 12 may pass. In another embodiment, a combination of a locker 38 and a reinforced wall portion 40 may be employed with a tendon 12. Such may be used, for example, where an especially high stress is expected to be applied to the wall of the CCS during use.

In one embodiment, the layer or strip, or article formed thereof, further includes at least one additional layer applied to or coextruded or co-molded with the first layer. In one such embodiment, the additional layer may include (1) a composition including the (a), (b) and (c) components in a combination which may be the same as or different from the composition of the first layer, or (2) a material different from the composition comprising said (a), (b) and (c). Thus, the additional layer may include the same composition, or a different composition within the scope of the present disclosure, or the additional layer may include some other material, such as another polymer or other structure suitable for the needed reinforcement.

Figure 7:
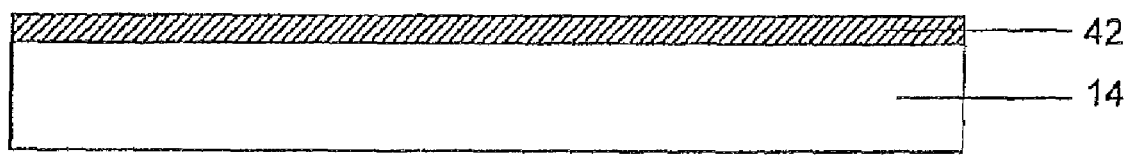
FIGS. 7 and 8 schematically illustrate two additional embodiments of the present disclosure, in which one or two outer layers are laminated or co-extruded with a strip including the compatibilized polymeric composition of the present disclosure.

FIG. 7 schematically illustrates an embodiment of the present disclosure, in which a strip 14, made in accordance with an embodiment of the compatibilized polymeric composition of the present disclosure, further includes an outer layer 42. The outer layer 42 may be applied by lamination or co-extrusion, or may be adhered to the strip 14 by an adhesive. The outer layer 42 may be composed of any appropriate material. In one embodiment, the outer layer 42 includes a polymeric material. In one embodiment, outer layer 42 includes a compatibilized polymeric composition in accordance with the present disclosure. In one embodiment, outer layer 42 includes a compatibilized polymeric composition in accordance with the present disclosure, but having a different combination of the PO, ET and compatibilizer In one embodiment, the outer layer 42 includes a polymeric material forming a barrier layer. The barrier layer may provide, for example, improved chemical resistance (for example ultrathin coating or deposit, such as parylene, plasma polymer, or inorganic layer), improved UV resistance, improved thermal resistance and/or improved friction with the GRM. Thus, in one embodiment, the outer layer 42 is formed of any of the compositions as disclosed in the present disclosure for use in the CCS itself. In one embodiment, the composition of the outer layer 42 may be the same composition as in the CCS with which the tendon is used, and in another embodiment, the composition of the outer layer 42 differs from that of the CCS with which it is used. In one embodiment, the outer layer 42 is formed of a composition having greater rigidity, obtained, for example, by a higher loading of the ET component. In one embodiment, the outer layer 42 is formed of a composition having greater rigidity, obtained, for example, by employing a different polymer or blend of polymers for the ET component of the composition.

Figure 8:
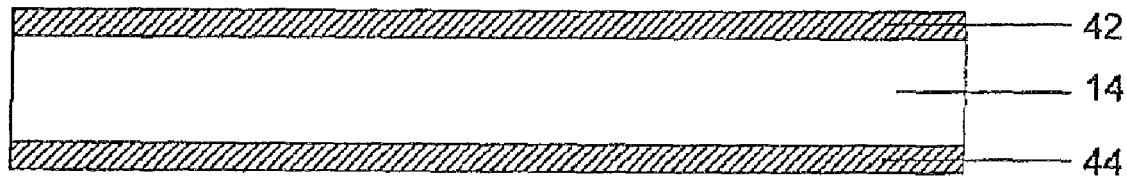

FIG. 8 schematically illustrates an embodiment of the present disclosure, in which a strip 14, made in accordance with an embodiment of the compatibilized polymeric composition of the present disclosure, further includes a first outer layer 42 and a second outer layer 44, disposed on the strip 14 on the side opposite that on which the first outer layer 42 is disposed. The outer layers 42 and 44 may be applied as described above with respect to the embodiment shown in FIG. 7, and may include any of the materials described above with respect to the embodiment shown in FIG. 7. In one embodiment, the second outer layer 44 is formed of the same material as the first outer layer 42, and in another embodiment, the second outer layer 44 is formed of a different material than that of the first outer layer 42.

The materials for use with each of the CCS, the tendons, the wedges and the reinforced wall portions may be appropriately selected by those of skill in the art based upon the foregoing description. In one embodiment, the materials may be appropriately selected as taught herein based on the geographical location at which the CCS is to be used, and more particularly, based on the known and expected maximum temperatures to which the CCS is to be exposed, and on the amount of sunlight to which the CCS is to be exposed. As noted above, this may be determined, in one aspect, based on the latitude at which the CCS is to be used.

In one embodiment, the geosynthetic article is a geomembrane. In one embodiment, the geomembrane includes a plurality of sheets welded or bonded together at respective edges thereof. In one embodiment, the geomembrane includes one or more sheet having one or more of (a) lower permeability to one or more of acids, bases, oils, fuels, heavy metals, dioxins, oxygen, nitrates, $SO_x$, $NO_x$, chlorofluorocarbons, organophosphorus compounds, herbicides, pesticides, halogens, halogen acids, ammonia, bacteria, viruses and organic solvents relative to a HDPE geomembrane having same dimensions; (b) at least 10% better retention of elastic modulus when exposed to fuels and hydrocarbons relative to a HDPE geomembrane having same dimensions; and (c) at least 10% higher creep modulus at a load of 20% of yield stress and loading time of 60 minutes, according to ISO 899-1 measured at 60 Celsius, relative to a HDPE geomembrane having same dimensions.

Figure 9:
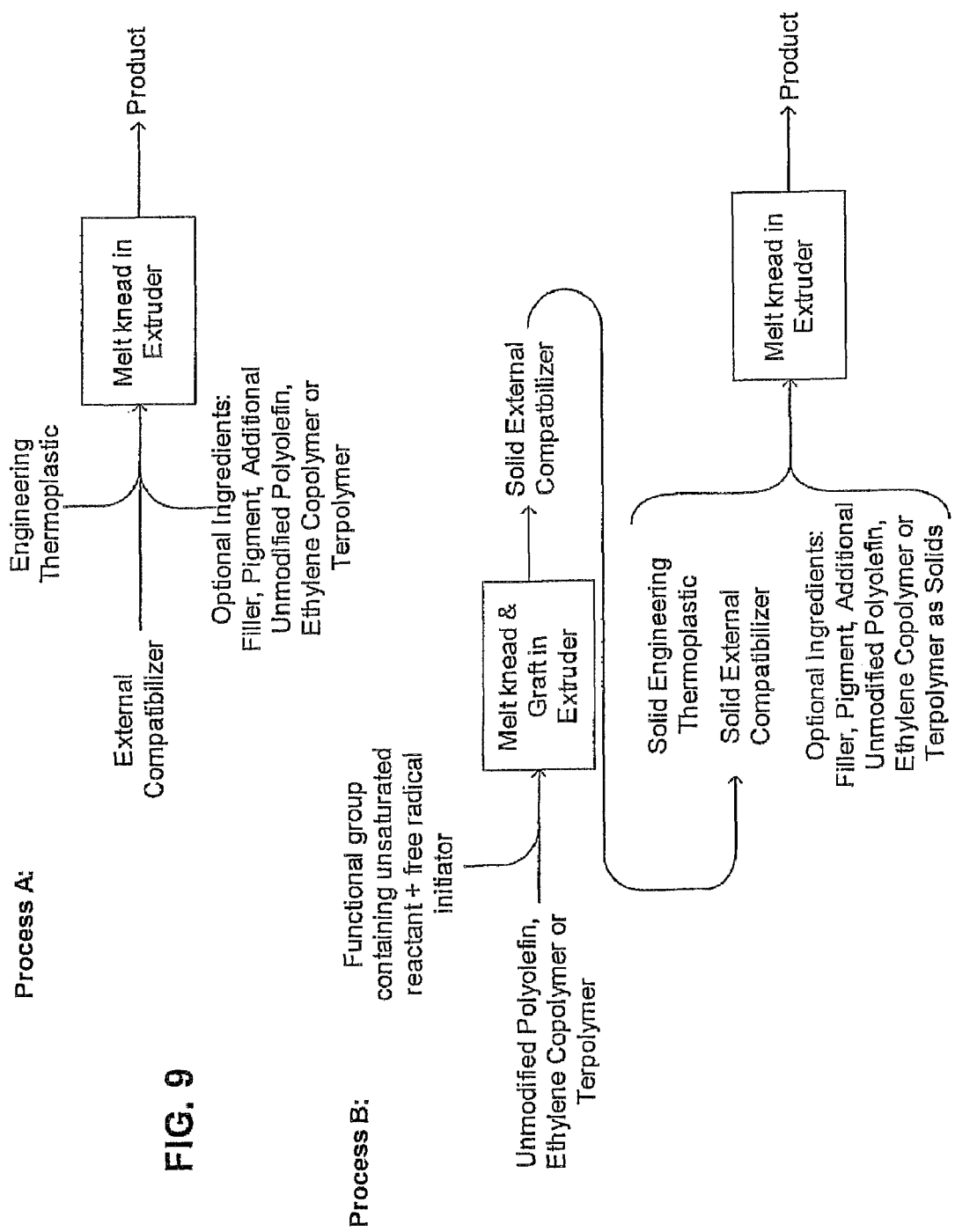
FIGS. 9 and 10 schematically illustrate four processes for making a polymeric composition in accordance with the present disclosure.
Figure 10:
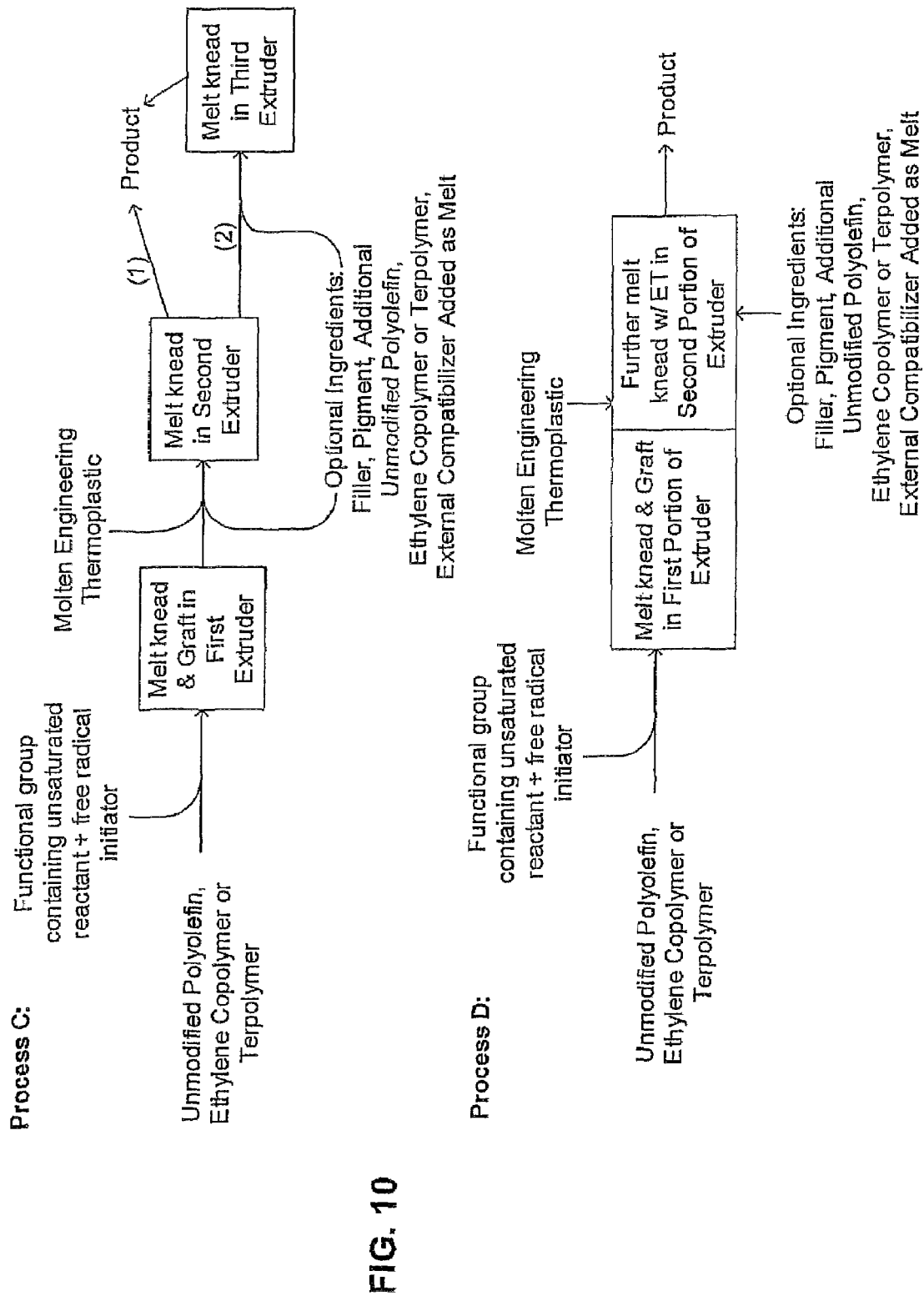

FIGS. 9 and 10 schematically illustrate four processes for making a polymeric composition in accordance with the present disclosure. Referring first to FIG. 9, there are shown two embodiments in which an external compatibilizer is employed.

In FIG. 9, in Process A, an external compatibilizer is combined with an engineering thermoplastic, and the mixture is melt kneaded in an extruder to form the product, which is a polymeric composition as described herein. The process optionally includes melt kneading together with the external compatibilizer and the engineering thermoplastic one or more optional ingredients. In the embodiment illustrated in Process A, the at least one functional group containing polymer or oligomer comprises an external compatibilizer.

In FIG. 9, in Process B, in a first step, an unmodified polyolefin, ethylene copolymer or terpolymer is combined with a functional group-containing unsaturated reaction and a free radical initiator in an extruder and these ingredients are melt kneaded and the functional group-containing unsaturated moiety is grafted onto the unmodified polyolefin, ethylene copolymer or terpolymer, to thereby form an external compatibilizer, which is collected as a solid, e.g., as pellets. In the second step, the external compatibilizer thus formed is combined with an engineering thermoplastic, and the mixture is melt kneaded in an extruder to form the product, which is a polymeric composition as described herein. The process optionally includes melt kneading together with the external compatibilizer and the engineering thermoplastic one or more optional ingredients. In the embodiment illustrated in Process B, the at least one functional group containing polymer or oligomer comprises an external compatibilizer.

Referring now to FIG. 10, there are shown two embodiments in which a self compatibilizer is formed and immediately employed in forming a composition in accordance with the present disclosure.

In FIG. 10, in Process C in a first step, an unmodified polyolefin, ethylene copolymer or terpolymer is combined with a functional group-containing unsaturated reaction and a free radical initiator in a first extruder and these ingredients are melt kneaded such that the functional group-containing unsaturated moiety is grafted onto the unmodified polyolefin, ethylene copolymer or terpolymer, to thereby form a self compatibilizer in the first extruder. The self-compatibilizer is then combined with a molten engineering thermoplastic in a second extruder, in which, in one embodiment, these ingredients are melt kneaded to form the product. In this embodiment, the process optionally includes melt kneading together with the self compatibilizer and the engineering thermoplastic one or more optional ingredients. If this is done by adding the optional ingredients at the same time that the engineering thermoplastic is added, all of these ingredients can be melt kneaded in the second extruder to form the product, as shown by the arrow (1) in Process C. In an alternate embodiment of Process C, the optional ingredients may be added to the process after the engineering thermoplastic has been melt kneaded with the self compatibilizer, in which case the optional ingredients can be melt kneaded with the product of the second extruder in a third extruder, as shown by the arrow (2) in Process C, to form the product.

In FIG. 10, in Process D, the entire process is carried out in a single extruder. In this embodiment, in a first portion of the extruder, an unmodified polyolefin, ethylene copolymer or terpolymer is combined with a functional group-containing unsaturated reaction and a free radical initiator and these ingredients are melt kneaded such that the functional group-containing unsaturated moiety is grafted onto the unmodified polyolefin, ethylene copolymer or terpolymer, to thereby form a self compatibilizer in the first portion of the extruder Then, in a second, downstream portion of the same extruder, a molten engineering thermoplastic is fed into the extruder through an appropriate port, and is combined with the newly formed self compatibilizer in a second extruder. In the second portion of the extruder, these ingredients are melt kneaded to form the product. In the embodiment illustrated in Process D in FIG. 10, the process optionally includes melt kneading together with the self compatibilizer and the engineering thermoplastic one or more optional ingredients. These optional ingredients may be added before, at the same time as, or following addition of the engineering thermoplastic. These ingredients are melt kneaded in the same extruder to form the product, as shown in FIG. 10, Process D.

It is noted that, among the optional ingredients in the embodiments shown in both Process C and Process D in FIG. 10, is an external compatibilizer which may be used in addition to the self compatibilizer formed in these embodiments of processes in accordance with the present disclosure.

EXAMPLES

Weld Test Example

For one embodiment of the present disclosure, the resistance to long term loading exhibited by welded strips formed of a compatibilized polymeric composition according to the present disclosure is shown in TABLE 1. A pair of strips of 100 mm width each are welded across the full width of 100 mm by ultrasonic sonotrode at 20 MHz, and the loads indicated in TABLE 1 are applied to ten such welded pairs at ambient temperature. The fraction of welded pairs left intact is measured versus the time period in days during which the indicated loads are applied. As shown in TABLE 1, the materials of the present disclosure provide high and improved weld strengths and durability, relative to prior art materials, such as HDPE or MDPE.

TABLE 1

Weld Test Results

| Period (days) | 77 Kg load | 88 Kg Load | 100 Kg Load |
| --- | --- | --- | --- |
| Day 1 to day 10 | All 10 remain intact | All 10 remain intact | All 10 remain intact |
| Day 1 to day 20 | All 10 remain intact | At least 9 remain intact | At least 8 remain intact |
| Day 1 to day 30 | All 10 remain intact | At least 8 remain intact | At least 6 remain intact |

By comparison, when the same tests are run with HDPE welded strips having the same width and thickness, the comparable failure rates are about 20% at 30 days under 77 Kg, about 40% at 30 days under 88 Kg and greater than 65% at 30 days under 100 Kg.

Examples 1-4

Example 1

A Compatibilized Polymeric Composition, a Strip and Welded Strips Formed Thereof According to the Present Disclosure Stage 1: Functionalization of HDPE:

1000 grams of polyethylene resin DowIeX™ 2344, manufactured by DOW, 1.2 gram Dicumyl peroxide and 15 grams Maleic anhydride, are dry blended. The mixture is fed into the main hopper of a co-rotating twin screw extruder having length to diameter ratio (L/D) of 40 at 100-200 RPM screw speed, and melt kneaded at 180-220° C., until a functionalized polymer is obtained. This polymer is used in the example as a self compatibilizer, and is referred to hereinafter as MA-PE.1.

Stage 2: Compounding of Hydrolytic-Stabilized and UV-Protected Compound:

500 grams of MA-PE.1, 500 grams of PA6 resin Ultramid™ B50L 01, manufactured by BASF, are fed into co-rotating twin screw extruder having L/D of 40 at 100-300 RPM screw speed, and melt kneaded at 280° C. From a side feeder, 180 grams of Talc lotalk Superfine™, manufactured by Yokal, 4 grams of Tinuvin™ 111 and 4 grams of Tinuvin™ 234, both manufactured by Ciba, and 10 grams of Stabaxol™ P200, manufactured by Rhein Chemie, are fed. The resulting compound is extruded and pelletized by a strand pelletizer and dried at 45° C.

The resulting product, referred to hereinafter as CB.1, is extruded to a strip 1.5 mm thick and 100 mm wide.

Tensile strength, modulus and creep modulus are measured 1 week after extrusion (referred to hereinafter as T.0) and after exposure for 60 days, in an aqueous solution having pH=6 at 45° C. (referred to hereinafter as T.60). Surface gloss and chalking are measured after 10,000 hours in QUV (QUV/Spray method, UVA-340 Lamp).

Two strips, each 100 mm width, are welded by ultrasonic sonotrode at 20 MHz. Ultimate weld strength is measured 48 hours after welding, and is referred to hereinafter as UWS.

A pair of strips of 100 mm length each are welded (weld width 100 mm), and ten welded couples are loaded by an 88 Kg load for a period of 30 days. The percentage of welded couples surviving intact is referred to hereinafter as % WCS88.

The resistance against organic fluids is evaluated by immersion for 60 days in Diesel fuel, and calculating the resultant weight gain.

The results are summarized in TABLE 2.

Example 2

A Composition, Strip and Welded Strips Thereof According to U.S. Pat. No. 6,875,520, as a Comparative Example (Not According to the Present Disclosure)

Stage 1: Functionalization of ethylene-methyl Acrylate Copolymer:

1000 grams of ethylene-methyl acrylate copolymer Lotryl™ 29 MA 03, manufactured by Arkema, 1.2 gram Dicumyl peroxide and 15 grams Maleic anhydride, are dry blended. The mixture is fed into co-rotating twin screw extruder, and melt kneaded at 220° C., until a functionalized polymer is obtained. This polymer is used in the example as a self compatibilizer, and referred to hereinafter as MA-LOT.1.

Stage 2: Compounding of PA-MA.LOT.1 Compound:

500 grams of MA-LOT.1, 500 grams of PA6 resin Ultramid™ B50L 01, manufactured by BASF, are fed into co-rotating twin screw extruder, and melt kneaded at 280° C. The compound is extruded and pelletized by a strand pelletizer and dried at 45° C.

The resulting product, referred to hereinafter as CB.520., is extruded to a strip 1.5 mm thick and 100 mm wide.

Tensile strength, modulus and creep modulus are measured 1 week after extrusion (referred to hereinafter as T.0) and after exposure for 60 days, in an aqueous solution having PH=6 at 45° C. (referred to hereinafter as T.60). Surface gloss and chalking are measured after 10,000 hours in QUV (QUV/Spray method, UVA-340 Lamp).

Two strips, each of 100 mm width, are welded across the full width by ultrasonic sonotrode at 20 MHz. Ultimate weld strength is measured 48 hours after welding, and is referred to hereinafter as UWS.

A pair of strips, each of 100 mm width, are welded across the full width of 100 mm, and a load of 88 Kg is applied to ten such welded couples for a period of 30 days. The percentage of welded couples surviving intact is referred to hereinafter as % WCS88.

The resistance against organic fluids is evaluated by immersion for 60 days of a sample of the material in Diesel fuel, and calculating the resultant weight gain.

The results are summarized in TABLE 2.

TABLE 2

Comparative Study of Durability of Blends

| Property | Example 1<br>CB.1 | Example 2<br>CB.520 |
|---|---|---|
| Tensile strength (MPa) @T.0 | 43 | 22 |
| Tensile modulus (MPa) @T.0 | 2600 | 457 |
| Tensile elongation to break (%) @T.0 | 180 | 225 |
| Tensile strength (MPa) @T.60 | 40 | 20 |
| Tensile modulus (MPa) @T.60 | 2000 | 332 |
| Tensile elongation to break (%) @T.60 | 125 | 25 |
| Surface properties (visual) after 10,000 hours in QUV | Slight loss of gloss, no cracks | Surface is etched and includes cracks and voids |
| UWS (N) | 2153 | 1200 |
| % WCS88 (%) | 90 | 60 |
| % weight gain in Diesel fuel (60 days@ 45° C.) | 4 | 35 |

Example 3

A Compatibilized Polymeric Composition, Strip and Welded Strips Thereof According to the Present Disclosure, Having Improved Thermal Stability and Improved Puncture Resistance at Minus 20° C.

Stage 1: Compounding of Hydrolytic Stabilized and UV Protected Compound:

200 grams of Bondyram 4001 maleated LLDPE, manufactured by Polyram, 200 grams of LLDPE resin LL1001™, manufactured by ExxonMobil, 300 grams of Exact™ 203 elastomer, manufactured by ExxonMobil, 300 grams of regrind PET from beverage bottles, 2 grams heat stabilizer Irganox™ B900, manufactured by Ciba, 5 grams of CYASORB™ UV-4042, manufactured by Cytec and 5 grams Tinuvin™ 494, manufactured by Ciba, are fed into a co-rotating twin screw extruder, and melt kneaded at 280° C. The compound is extruded and pelletized by a strand pelletizer and dried at 45° C.

The resulting product, referred to hereinafter as CB.3, is extruded to a strip 1.5 mm thick and 150 mm wide.

Tensile strength, modulus and creep modulus are measured 1 week after extrusion (referred to hereinafter as T.0) and at 75° C. degrees (referred to hereinafter as @75) and at minus 20° C. (referred to hereinafter as @minus 20). Surface gloss and chalking are measured after 10,000 hours in QUV (QUV/Spray method, UVA-340 Lamp).

Two strips, each of 100 mm width, are welded across their full width by ultrasonic sonotrode at 20 MHz. Ultimate weld strength is measured 48 hours after welding, and is referred to hereinafter as UWS.

UWS is compared at ambient, plus 75° C. and minus 20° C.

A pair of strips of 100 mm each are welded across their full width of 100 mm, and a 88 Kg load is applied to ten such welded couples for a period of 30 days. The percentage of welded couples surviving intact is referred to hereinafter as % WCS088.

The resulting % WCS88 at ambient, plus 75° C. and minus 20° C. is compared, the results are shown in TABLE 3.

TABLE 3

Summary of Properties of CB.3

| Property | CB.3@ambient | CB.3@75° C. | CB.3@minus 20° C. |
|---|---|---|---|
| Tensile strength (MPa) | 28 | 24 | 40 |
| Tensile modulus (MPa) | 1300 | 1000 | 1800 |
| Tensile elongation to break % | 300 | 320 | 180 |
| Surface properties (visual) after 5000 hours in QUV | Slight loss of gloss, no cracks, | NA | NA |
| UWS (N) | 1900 | 1200 | 1900 |
| % WCS88 (%) | 90 | 80 | 90 |

Example 4

Five high performance mixtures, INV1-INV5, and a reference mixture (UV stabilized HDPE), are made. Their compositions are shown in TABLE 4. In addition, each mixture includes 0.5% $TiO_2$ pigment, Kronos TM 2222 manufactured by Kronos, and 0.2% PV Fast Brown HFR™ brown pigment, manufactured by Clariant. The polymers, additives and pigments are fed to a main hopper of a co-rotating twin screw extruder having L/D of 40 at 100-300 RPM screw speed, running at 100-400 RPM at barrel temperature of 260 to 285° C. The polymers are melted and the additives are dispersed by at least one kneading zone. Filler is provided from a side feeder. Steam and gases are removed by an atmospheric vent and the product is extruded and pelletized by a strand pelletizer.

TABLE 4

Composition of Polymers

| Ingredient | INV1 | INV2 | INV3 | INV4 | INV5 | Reference |
|---|---|---|---|---|---|---|
| MA Functionalized HDPE (Kg) | 100 | 100 | 70 | 40 | 40 | 100 Virgin HDPE, Non-functionalized |
| LLDPE (Kg) | 0 | 0 | 0 | 30 | 0 | 0 |
| Ethylene-Acrylate (Kg) | 0 | 0 | 0 | 0 | 30 | 0 |
| PET (Kg) | 30 | 30 | 30 | 30 | 30 | 0 |
| Talc (Kg) | 20 | 0 | 20 | 20 | 20 | 0 |
| Organic UV absorber (Kg) | 0.35 | 0.25 | 0.25 | 0.25 | 0.25 | 0.25 |
| Inorganic UV absorber (Kg) | 0 | 1 | 1 | 1 | 1 | 0 |
| HALS (Kg) | 0.25 | 0.25 | 0.25 | 0.25 | 0.25 | 0.25 |
| Nano-clay (Kg) | 0 | 0 | 1 | 0 | 1 | 0 |

Ingredients:
MA Functionalized HDPE resin - HDPE M 5010, manufactured by Dow, grafted by 0.25-0.40% MA in a reactive extruder;
LLDPE resin - LL 3201, by Exxon Mobil;
HDPE resin - HDPE M 5010, by Dow;
Ethylene-Acrylate resin - Lotryl ™ 29MA03, Arkema;
Talc - Iotalk ™ superfine. by Yokal;
Organic UV absorber - Tinuvin ™ 234, by Ciba;
Inorganic UV absorber - SACHTLEBEN ™ Hombitec RM 130F TN, by Sachtleben;
HALS - Hindered Amine Light Stabilizer - Chimassorb TM 944, by Ciba;
Nano-clay - Nanomer TM I31PS, by Nanocor.

Next, five polymeric strips ST1-ST5 and one reference strip are made (ST1 includes INV1, ST2 includes INV2 . . . etc.). All strips are manufactured in a sheet extrusion line including a main single screw extruder for the core layer and secondary single screw for two outer layers. The core layer thickness is 1 mm and the outer layers have a thickness of 0.25 mm each. Both outer layers and core layer are of the same polymer composition.

Evaluation (1) Accelerated heat aging—five strips are heat aged in oven at 110° C. for 7 days and the relative loss of elongation to break is determined ((initial elongation minus final elongation), divided by initial elongation).

(2) weathering after heat aging.—In order to simulate resistance to UV/heat aging after prolonged exposure to hot conditions, five strips are humidity/heat aged in water at 85° C. for 28 days to simulate extraction and hydrolysis of the additives and then exposed to artificial sunlight in a Heraeus Xenotest 1200 W WOM apparatus. The conditions are relative humidity=60%, black panel=60° C., 102 minutes dry cycle, 18 minutes wet cycle. The color difference (delta E) and relative loss of elongation to break ((initial elongation minus final elongation), divided by initial elongation) are measured after 10,000 hours aging. The results are summarized in TABLE 5.

TABLE 5

Results of Aging Test

| | Strip Number | | | | | |
|---|---|---|---|---|---|---|
| | ST1 | ST2 | ST3 | ST4 | ST5 | Ref |
| Delta E after heat aging + weatherometer | 12 | 11 | 9 | 14 | 8 | 28 |
| Relative loss of elongation to break after heat aging (%) | 20 | 22 | 16 | 18 | 14 | 40 |
| Relative loss of elongation to break after heat aging + weatherometer (%) | 28 | 28 | 29 | 26 | 26 | 58 |

Twenty-two more strips, 100 mm each, are welded by ultrasonic horn at 20 MHz from which is obtained 10 pairs of test strips ST1-ST5, and one pair of reference, Ref, from each of the six compositions. Five couples are measured (average tensile strength of weld) 48 hours after welding (referred to as t=0) and after aging in an oven at 110° C. for 7 days (the result is referred as t=7d @110). The results are summarized in TABLE 6.

TABLE 6

Weld Strength Resistance to Heat Aging

| | Strip Number | | | | | |
|---|---|---|---|---|---|---|
| | ST1 | ST2 | ST3 | ST4 | ST5 | Ref |
| Weld strength (N) T = 0 | 1800 | 1650 | 1910 | 1710 | 1750 | 1380 |
| Weld strength (N) T = 7 d@110 | 1520 | 1433 | 1800 | 1577 | 1650 | 825 |

All of the compatibilized polymeric compositions, and the processes for making and using the same, disclosed and claimed herein can be made and executed by those of ordinary skill in the art without undue experimentation in light of the present disclosure and based upon the knowledge of such persons. While the compositions and processes of this present disclosure have been described in terms of certain preferred embodiments, it will be apparent to those of ordinary skill in the art that variations may be applied to the compositions and/or processes and in the steps or in the sequence of steps of the processes described herein without departing from the concept, spirit and scope of the present disclosure. It will be apparent that certain agents that are chemically related may be substituted for the agents described herein while the same or similar results would be achieved. All such similar substitutes and modifications apparent to those skilled in the art are deemed to be within the spirit, scope and concept of the present disclosure as defined by the appended claims. In addition, notwithstanding that every possible combination of the particularly disclosed embodiments has not been described herein, as will be understood by those of skill in the art, all such combination and permutations are within the scope of the present disclosure. Thus, every alternative combination of each of the various elements described herein is understood as within the scope of the present disclosure.

The invention claimed is:

1. A geotechnical article comprising at least one layer, said at least one layer having:
   a coefficient of thermal expansion less than about 150 ppm/° C. at ambient temperature;
   resistance to acidic media greater than polyamide 6 resin and/or resistance to basic media greater than PET resin;
   resistance to hydrocarbons greater than that of HDPE;
   creep modulus of at least 400 MPa at 25° C., at a load of 20% of yield stress and loading time of 60 minutes, according to ISO 899-1; and
   1 percent secant flexural modulus of at least 700 MPa, at 25° C. according to ASTM D790;
   said at least one layer formed of a composition comprising:
   (a) from about 1 to about 94.5% by weight of the composition of at least one functional group containing polymer or oligomer comprising on average at least one functional group per polymer or oligomer chain, said at least one functional group selected from carboxyl, anhydride, oxirane, amino, amido, ester, oxazoline, isocyanate or any combination thereof;
   (b) from about 5 to about 98.5% by weight of the composition of at least one engineering thermoplastic;
   (c) from about 0.5 to about 94% by weight of the composition of at least one filler; and
   (d) optionally, up to about 93.5% by weight of an unmodified polyolefin, ethylene copolymer or ethylene terpolymer.

2. The geotechnical article of claim 1 wherein said filler is in a form of a powder, whiskers or fibers, and wherein when in the form of a powder has an average particle size less than about 30 microns.

3. The geotechnical article of claim 1 wherein content of (b) is from about 90 weight percent to about 10 weight percent.

4. The geotechnical article of claim 1 wherein said (c) at least one filler comprises a metal oxide, a metal carbonate, a metal sulfate, a metal phosphate, a metal silicate, a metal borate, a metal hydroxide, a silica, a silicate, an aluminate, an alumo-silicate, chalk, talc, dolomite, an organic or inorganic fiber or whisker, a metal, metal-coated inorganic particles, clay, kaolin, industrial ash, concrete powder, cement, dolomite, wollastonite or combinations thereof.

5. The geotechnical article of claim 1 wherein said at least one engineering thermoplastic is selected from (i) a polyamide; (ii) a polyester; (iii) a polyurethane; or copolymers, block copolymers, blends or thereof.

6. The geotechnical article of claim 1 wherein said functional group containing polymer or oligomer is a modified polyolefin, ethylene copolymer or ethylene terpolymer, wherein said functional group is grafted to said polymer or oligomer.

7. The geotechnical article of claim 1 wherein said functional group containing polymer or oligomer is a copolymer or terpolymer of (1) at least one unsaturated monomer and (2) at least one functional group containing unsaturated monomer, wherein the functional group containing unsaturated monomer contains at least one unsaturated group and at least one said functional group.

8. The geotechnical article of claim 1 wherein said at least one functional group containing polymer or oligomer is selected from a maleic anhydride grafted polyethylene, a maleic anhydride grafted ethylene-acrylic or methacrylic ester copolymer or terpolymer, a maleic anhydride grafted propylene homopolymer or copolymer, a maleic anhydride grafted ethylene-alpha olefin polymer, a maleic anhydride grafted ethylene-propylene rubber, a glycidyl methacrylate or acrylate (GMA) grafted polyethylene, a GMA grafted ethylene-acrylic or methacrylic ester co-polymer or terpolymer, a GMA grafted propylene homopolymer or copolymer, a GMA grafted ethylene-alpha olefin polymer, a GMA grafted ethylene-propylene rubber, an acrylic or methacrylic acid grafted ethylene copolymer or terpolymer, an acrylic and methacrylic acid ionomer, a styrene-maleic anhydride copolymer or terpolymer, a styrene-acrylic acid or styrene-methacrylic acid copolymer or terpolymer, a copolymer or terpolymer of ethylene-glycidyl methacrylate or ethylene-glycidyl acrylate, or any combination thereof.

9. The geotechnical article of claim 1 wherein said (d) unmodified polyolefin, ethylene copolymer or ethylene terpolymer is independently selected from polyethylene, ethylene-vinyl acetate, polypropylene, ethylene-alpha olefin elastomer, ethylene-propylene elastomer, ethylene-propylene diene elastomer, ethylene-acrylate ester or methacrylate ester copolymer or terpolymer, or any copolymer or combinations thereof.

10. The geotechnical article of claim 1 wherein said composition further comprises an additive selected from heat stabilizer, hindered amine light stabilizer (HALS), organic UV absorber, inorganic UV absorber, hydrolysis inhibitor or combinations thereof.

11. The geotechnical article of claim 10 wherein said hydrolysis inhibitor is reactive with end or side groups of said at least one engineering thermoplastic and is one or more selected from a carbodiimide, a poly-carbodiimide, a blocked isocyanate, an epoxy resin, a phenolic resin, a novolac resin, a melamine resin, a urea resin, a glycoluril resin, tri-isocyanuric acid and derivatives thereof, a styrene-maleic anhydride resin, or an aromatic or cycloaliphatic diacid or an anhydride thereof.

12. The geotechnical article of claim 1 wherein said composition further comprises nano-size particles characterized by barrier properties, and permeability of said composition to molecules having a molecular weight lower than about 1000 Daltons is at least 10 percent lower as compared with a composition comprising a same composition but without said nano-size particles.

13. The geotechnical article of claim 12 wherein said nano-size particles are selected from nano-clay, nano-silica, nano-silicates, nano-alumosilicates, nano-zinc oxide, nano-titanium oxides, nano-zirconium oxides, nano-talc, nano-tubes, nano-metal particles and/or flakes, carbon black, nano size sulfides and sulfates and nano-size plant or animal originated cellulose, lignin or proteins and combinations thereof.

14. The geotechnical article of claim 1 wherein said article comprises an extruded or molded strip having a thickness in the range from about 0.1 mm to about 5 mm.

15. The geotechnical article of claim 14 wherein the strip, having a given size, has at least 10% greater pullout force at normal stress of 4 lb/in$^2$ (about 27.58 kPa), between the strip and sand, relative to a strip of the given size formed of virgin MDPE or HDPE, as tested by ASTM D06706-01.

16. The geotechnical article of claim 14 comprising friction-promoting features on at least one outer surface of said article, wherein said friction-promoting features comprise texture, embossment, debossment, through-hole, finger-like extension, hair-like extension, wave-like extension, co-extruded line, bonded fibers or grains or aggregate, dots, matte or combinations thereof.

17. The geotechnical article of claim 14 wherein said geotechnical article is a three dimensional cellular confinement system (CCS) comprising a plurality of said strips, each of said strips communicating with its neighboring in a side by side relationship via discrete physical joints, wherein said joints are spaced one from the other by non-joined areas.

18. The geotechnical article of claim 17 wherein said three dimensional CCS is adapted for containment and/or confinement and/or reinforcement of earthen material, soil, rock, gravel, sand, stone, peat, clay, concrete, aggregate, and combinations thereof.

19. The geotechnical article of claim 17 wherein said joints are provided by welding, bonding, sewing, stapling, riveting, or combinations thereof.

20. The geotechnical article of claim 19 wherein said joints are welded by one or more of ultrasonic welding, laser welding, and hot-press welding.

21. The geotechnical article of claim 20 characterized by at least 10% shorter cycle time of welding relative to virgin HDPE for an equal weld dimension.

22. The geotechnical article of claim 19 wherein said joints are welded, and the ultimate weld strength of two welded strips at ambient temperature is greater than about 1300 N for a weld width of 100 mm.

23. The geotechnical article of claim 19 wherein said joints are welded, and the ultimate weld strength of two welded strips at minus 20° C. is greater than about 1000 N for a weld width of 100 mm.

24. The geotechnical article of claim 19 wherein said joints are welded, and the ultimate weld strength of two welded strips at plus 70° C. is greater than about 1000 N for a weld width of 100 mm.

25. The geotechnical article of claim 17 wherein said distance between said joints is in the range of about 50 mm to about 1500 mm.

26. The geotechnical article of claim 17 wherein said joints are welded, and when said welded joints are subjected to a continuous load of 77 Kg per 100 mm weld width for 10 days at ambient temperature, substantially all of said welded joints remain intact.

27. The geotechnical article of claim 17 wherein said joints are welded, and when said welded joints are subjected to a continuous load of 77 Kg per 100 mm weld width for 30 days at ambient temperature, substantially all of said welded joints remain intact.

28. The geotechnical article of claim 17 wherein said joints are welded, and when said welded joints are subjected to a continuous load of 88 Kg per 100 mm weld width for 20 days at ambient temperature, about 90% or more of said welded joints remain intact.

29. The geotechnical article of claim 17 wherein said joints are welded, and when said welded joints are subjected to a continuous load of 88 Kg per 100 mm weld width for 30 days at ambient temperature, about 80% or more of said welded joints remain intact.

30. The geotechnical article of claim 17 wherein said joints are welded, and when said welded joints are subjected to a continuous load of 100 Kg per 100 mm weld width for 10 days at ambient temperature, substantially all of said welded joints remain intact.

31. The geotechnical article of claim 17 wherein said joints are welded, and when said welded joints are subjected to a continuous load of 100 Kg per 100 mm weld width for 20 days at ambient temperature, about 80% or more of said welded joints remain intact.

32. The geotechnical article of claim 17 wherein said joints are welded, and when said welded joints are subjected to a continuous load of 100 Kg per 100 mm weld width for 30 days at ambient temperature, about 60% or more of said welded joints remain intact.

33. The geotechnical article of claim 1 further comprising a reinforcing structure adapted for use in attaching the article to a substrate.

34. The geotechnical article of claim 1 wherein the composition has a 1% secant modulus according to ASTM D790 of at least 600 MPa when measured at 45° C.

35. The geotechnical article of claim 1 wherein the composition has a 1% secant modulus according to ASTM D790 of at least 500 MPa when measured at 70° C.

36. The geotechnical article of claim 1 wherein the composition has a 1 percent secant flexural modulus according to ASTM D790 that is at least 10% greater than that of HDPE, when measured at a temperature of about 45° C.

37. The geotechnical article of claim 1 wherein the composition has a 1 percent secant flexural modulus according to ASTM D790 that is at least 10% better than that of HDPE, when measured at a temperature of about 70° C.

38. A geotechnical article as in claim 1 further comprising at least one additional layer applied to or coextruded or co-molded with said first layer.

39. The geotechnical article of claim 1 wherein the article is a geomembrane.

40. The geotechnical article of claim 1 wherein said at least one layer provides at least 10% greater thermal conductivity relative to a layer of HDPE having the same dimensions.

41. The geotechnical article of claim 1 wherein when said at least one layer further comprises an additive selected from a HALS, an organic UV absorber or an inorganic UV absorber or any combination thereof, the layer provides at least 10% lower extraction, evaporation and/or hydrolysis rate of said additive relative to a layer of HDPE comprising the same additive and having the same dimensions.

42. The geotechnical article of claim 1 wherein said at least one layer exhibits at least a 10% lower weight increase after immersion for 60 days at 25° C. in n-octane relative to a layer of HDPE having the same dimensions.

43. The geotechnical article of claim 1 wherein said at least one layer exhibits at least 10% better retention of elongation to break after immersion for 60 days at 45° C. in aqueous solution having pH=11 relative to a layer of PET having the same dimensions.

44. The geotechnical article of claim 1 wherein said at least one layer exhibits at least 10% better retention of elongation to break after immersion for 60 days at 45° C. in aqueous solution having pH=4 relative to a layer of PA6 having the same dimensions.

45. The geotechnical article of claim 1 wherein said composition comprises a continuous phase and a discontinuous phase dispersed in domains throughout said continuous phase, wherein substantially all of said domains have a largest dimension of about 10 microns or less.

46. The geotechnical article of claim 1 wherein said geotechnical article is a cellular confinement system, a geomembrane or a geogrid.

47. A process for forming a geotechnical article comprising at least one layer, said at least one layer having:
 a coefficient of thermal expansion less than about 150 ppm/° C. at ambient temperature;
 resistance to acidic media greater than polyamide 6 resin and/or resistance to basic media greater than PET resin;
 resistance to hydrocarbons greater than that of HDPE;
 creep modulus of at least 400 MPa at 25° C., at a load of 20% of yield stress and loading time of 60 minutes, according to ISO 899-1; and
 1 percent secant flexural modulus of at least 700 MPa, at 25° C. according to ASTM D790;
 said at least one layer formed of a composition comprising:
 (a) from about 1 to about 94.5% by weight of the composition of at least one functional group containing polymer or oligomer comprising on average at least one functional group per molecule, said at least one functional group selected from carboxyl, anhydride, oxirane, amino, amido, ester, oxazoline, isocyanate or any combination thereof;
 (b) from about 5 to about 98.5% by weight of the composition of at least one engineering thermoplastic;
 (c) from about 0.5 to about 94% by weight of the composition of at least one filler; and
 (d) optionally, up to about 93.5% by weight of an unmodified polyolefin, ethylene copolymer or ethylene terpolymer;
 wherein said process comprises:
 (i) providing said (a) at least one functional group containing polymer or oligomer and said (b) at least one engineering thermoplastic;
 (ii) melt kneading said combined (a) and (b);
 (iii) adding said (c) at least one filler and further melt kneading said combined (a), (b) and (c);
 (iv) optionally adding said (d) at least one unmodified polyolefin, ethylene copolymer or ethylene terpolymer to any of said (a), (b) or (c) or combination thereof; and
 (v) extruding said composition into a strip, a profile, a film or sheet, a powder, or a plurality of beads, flakes, granules or pellets.

48. The process of claim 47 further comprising remelting said powder or said plurality of beads, flakes, granules or pellets and extruding, molding or forming said remelt into a strip, a profile, a film, a sheet or a molded three-dimensional geotechnical article.

49. The process of claim 47 wherein said geotechnical article is a cellular confinement system, a geomembrane or a geogrid.

* * * * *